(12) United States Patent
McKinstry et al.

(10) Patent No.: US 11,777,220 B2
(45) Date of Patent: Oct. 3, 2023

(54) LIGHT PATH DEFINING APPARATUS AND METHODS

(71) Applicant: Syght, Inc., Golden, CO (US)

(72) Inventors: Kevin D. McKinstry, Westminster, CO (US); Charles C. Partee, Golden, CO (US)

(73) Assignee: Syght, Inc., Golden, CO (US)

(*) Notice: Subject to any disclaimer, the term of this patent is extended or adjusted under 35 U.S.C. 154(b) by 155 days.

(21) Appl. No.: 17/174,071

(22) Filed: Feb. 11, 2021

(65) Prior Publication Data
US 2021/0194141 A1    Jun. 24, 2021

Related U.S. Application Data

(63) Continuation-in-part of application No. 16/936,340, filed on Jul. 22, 2020, now Pat. No. 11,586,062.
(Continued)

(51) Int. Cl.
*H01Q 13/02* (2006.01)
*G01J 5/08* (2022.01)
(Continued)

(52) U.S. Cl.
CPC ............ *H01Q 13/02* (2013.01); *G01J 5/0803* (2013.01); *H04B 10/90* (2013.01)

(58) Field of Classification Search
CPC . G02F 1/09; G02F 1/092; G02F 1/095; G02F 1/03; G02F 1/0311; G02F 1/0322; G02F 1/035; G02F 2201/18; G02F 2203/07; G02F 2203/12; H04N 9/3167; H04N 5/225; H04N 5/2253; G02B 3/005; G02B 3/0056; H01Q 13/02; G01J 5/0803; H04B 10/90
(Continued)

(56) References Cited

U.S. PATENT DOCUMENTS

| 4,495,492 A | 1/1985 | Anderson et al. |
| 4,497,545 A | 2/1985 | Ross |

(Continued)

FOREIGN PATENT DOCUMENTS

JP    H07311376 A    11/1995

OTHER PUBLICATIONS

Liang et al "Highly efficient solar-pumped Nd:YAG laser"; Optics Express, vol. 19, No. 27; Dec. 19, 2011; p. 26399 (Year: 2011).*
(Continued)

*Primary Examiner* — Jie Lei
(74) *Attorney, Agent, or Firm* — Pritzkau Patent Group LLC

(57) ABSTRACT

An apparatus includes a horn having a horn body including at least one horn sidewall defining a first opening that tapers down to a second opening in a direction of elongation and a port that is tubular and dimensionally uniform transverse to the direction of elongation and extends in the direction of elongation from a first port end that is in communication with the second opening to a second port end that defines an external opening. A dielectric rod includes a rod length extending between a first rod end and a second rod end with the first rod end extending through the external opening of the second port end and into the port cavity such that the first rod end is in a spaced apart relationship from the port sidewall along the light path.

15 Claims, 22 Drawing Sheets

Related U.S. Application Data

(60) Provisional application No. 62/878,728, filed on Jul. 25, 2019.

(51) Int. Cl.
  *H04B 10/90* (2013.01)
  *G01J 5/0803* (2022.01)

(58) Field of Classification Search
  USPC ...... 359/237, 245, 254, 247, 275; 385/1, 12, 385/31, 33, 34; 348/162, 744
  See application file for complete search history.

(56) References Cited

U.S. PATENT DOCUMENTS

| | | | |
|---|---|---|---|
| 4,550,389 A | 10/1985 | Cox et al. | |
| 4,550,983 A | 11/1985 | Ross | |
| 4,563,236 A | 1/1986 | Ross et al. | |
| 4,578,321 A | 3/1986 | Ross et al. | |
| 4,661,809 A | 4/1987 | Anderson et al. | |
| 5,048,937 A | 9/1991 | Takeda et al. | |
| 5,604,607 A | 2/1997 | Mirzaoff | |
| 5,666,226 A | 9/1997 | Ezra et al. | |
| 6,768,873 B1 | 7/2004 | Palese | |
| 7,835,600 B1 | 11/2010 | Yap et al. | |
| 8,855,431 B2 | 10/2014 | Donoho | |
| 8,941,431 B2 | 1/2015 | Granhaug et al. | |
| 10,345,631 B1 | 7/2019 | Partee et al. | |
| 10,698,290 B2 | 6/2020 | Partee | |
| 10,747,032 B1 | 8/2020 | Partee et al. | |
| 11,378,829 B2 | 7/2022 | Partee et al. | |
| 2004/0085613 A1 | 5/2004 | Lassar | |
| 2004/0190107 A1 | 9/2004 | Hiironen et al. | |
| 2012/0006382 A1 | 1/2012 | Dagli et al. | |
| 2013/0050775 A1 | 2/2013 | Curry et al. | |
| 2013/0257646 A1 | 10/2013 | Gopalsami et al. | |
| 2014/0063332 A1 | 3/2014 | Miyawaki | |

OTHER PUBLICATIONS

Kaiyan et al, "Design and investigation of a novel concentrator used in solar fiber lamp"; Solar Energy 83 (2009), p. 2086 (Year: 2009).*

Meng et al: "A review on the recent research progress in the compound parabolic concentrator (CPC) for solar energy applications"; Renewable and Sustainable Energy Reviews 82 (2018) 1272-1296 (Year: 2017).*

Applicant's Response to the International Search Report and Written Opinion for PCT Application PCT/US2020043352, which is related to U.S. Appl. No. 16/936,319, dated Apr. 12, 2021.

Babacan, et al., Compressive Passive Millimeter-Wave Imaging, 2011 18th IEEE Conference on Imaging. A publication month is not of issue since publication at any time in 2011 is sufficiently early.

Heidari, et al., A 2D Camera Design with a Single-pixel Detector, 2009 34th International Conference on Infrared, Millimeter, and Terahertz Waves. A publication month is not of issue since publication at any time in 2009 is sufficiently early.

Spinoulas, et al., Optimized compressive sampling for passive millimeter-wave imaging, published Sep. 7, 2012.

The International Preliminary Report on Patentability for PCT Application PCT/US2020043353, which is related to U.S. Appl. No. 16/936,340, Geneva, Switzerland, dated Feb. 3, 2022.

The International Search Report and Written Opinion for PCT Application PCT/US2020043353, which is related to U.S. Appl. No. 16/936,340, Daejeon, Republic of Korea, dated Nov. 9, 2020.

Uzi Efron, Spatial Light Modulator Technology Materials, Devices and Applications; pp. 361-371, copyright 1995.

Prosecution History for U.S. Appl. No. 16/936,319 as of Sep. 30, 2022.

Prosecution History for U.S. Appl. No. 16/936,340 as of Sep. 30, 2022.

The International Preliminary Report on Patentability for PCT Application PCT/US202003352, which is related to U.S. Appl. No. 16/936,319, dated Jul. 29, 2021.

The International Search Report and Written Opinion for PCT Application PCT/US2020043352, which is related to U.S. Appl. No. 16/936,319, Daejeon, Republic of Korea, dated Nov. 6, 2020.

* cited by examiner

LIGHT PATH DEFINING APPARATUS AND METHODS

RELATED APPLICATIONS

The present application is a continuation-in-part of U.S. patent application Ser. No. 16/936,340 entitled ADVANCED OPTOELECTRONIC SYSTEM ARCHITECTURES AND ASSOCIATED METHODS USING SPATIAL LIGHT MODULATION, filed on Jul. 22, 2020, which claims priority from U.S. Provisional Patent Application Ser. No. 62/878,728 filed on Jul. 25, 2019 and both of which are incorporated herein by reference in their entirety.

STATEMENT REGARDING FEDERALLY SPONSORED RESEARCH

This invention was made with Government support under Grant No. 1852971, awarded by the National Science Foundation. The Government has certain rights in this invention.

BACKGROUND

The present invention is generally related to the field of systems which utilize light paths, for instance, to modulate light and, more particularly, to advanced system architectures and methods for defining a light path.

Applicant recognizes that systems which employ a Spatial Light Modulator (SLM) to receive an incoming beam of light and modify one or more characteristics of the light as a function of the cross-sectional position within the beam of light are well known. The amount of modification and type of characteristic(s) modified can change with respect to time as well as with respect to position within the beam; this is frequently referred to as modulation. Some example types of characteristics that can be changed in modulating the beam of light are amplitude (intensity), phase, and polarization. Modulation frequently is controlled by electrical signals that are supplied to the SLM. It should be noted that the term "light" used throughout this application refers to electromagnetic radiation or Electro-Magnetic Waves (EMW). In some other documentation, the term "light" may be used to only refer to EMW in the visible spectrum. That is not the case in this application; herein the term "light" refers to EMW anywhere in the frequency/wavelength spectrum that is suitable for modulation by the systems disclosed herein.

One example of a prior art spatial light modulation system is seen in U.S. Pat. No. 8,941,061 by Gopalsami, et al (hereinafter the '061 patent). The '061 patent uses a two lens system in which a single mask provides for spatial light modulation in a compressive sampling implementation. In particular, a single mask 301 (FIG. 3) is moved by a two axis translational stage 303 to provide for different mask patterns. Unfortunately, it is respectfully submitted that moving a large physical mask in the manner suggested would result in a system that is incapable of generating enough imaging information to be acceptable for practical applications such as, for example, real time security applications. More importantly, the use of an imaging lens 305 between mask 301 and an imaging target 302, as well as a second lens 311 between mask 301 and a detector 313 is submitted to provide limited flexibility as compared to the advanced systems yet to be described below.

Another example of a prior art spatial light modulation system is seen in U.S. Pat. No. 8,199,244 by Baraniuk, et al (hereinafter the '244 patent). Like the '061 patent, FIG. 1 of the '244 patent discloses a simple two lens system. Instead of using a single physical mask, however, the '244 patent uses a micro-mirror array 140. Again, it is submitted that such a system would provide limited flexibility as compared to the advanced systems yet to be described below.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the above described problems have been reduced or eliminated.

In general, an optoelectronic system and associated methods are described. In a system embodiment and associated method, the system includes a concentration layer including an array of optical concentrators, each optical concentrator including a concentrator input area and a concentrator output area that is smaller than the concentrator input area such that each concentrator concentrates a portion of an input light beam received at the concentrator input area into the concentrator output area. A modulation layer including an array of light modulators with each light modulator having a modulator input area that is supported in optical communication with the concentrator output area of one of the optical concentrators for modulating the portion of the input light beam and the light modulators are spaced apart from one another in the modulation layer to cooperatively produce a modulation layer output having a modulation layer output spatial distribution. An exit layer receives the modulation layer output having the modulation layer output spatial distribution and remaps the modulation layer output spatial distribution to a modified spatial distribution. A collector layer receives the modified spatial distribution to produce a collector layer output. At least one detector receives the collector layer output to generate a detector output therefrom. A processor is configured for controlling the modulation layer and for receiving the detector output to generate an image based on the input light beam.

In another system embodiment and associated method according to the present disclosure, an optoelectronic system includes a concentration layer including an array of optical concentrators, each optical concentrator including a concentrator input area and a concentrator output area that is smaller than the concentrator input area such that each concentrator concentrates a portion of an input light beam received at the concentrator input area into the concentrator output area. A modulation layer includes an array of light modulators with each light modulator having a modulator input area that is supported in optical communication with the concentrator output area of one of the optical concentrators for modulating the portion of the input light beam and the light modulators are spaced apart from one another in the modulation layer to cooperatively produce a modulation layer output having a modulation layer output spatial distribution. An exit layer receives the modulation layer output having the modulation layer output spatial distribution and remaps the modulation layer output spatial distribution to a modified spatial distribution. A collector layer receives the modified spatial distribution at a plurality of collector layer inputs and combines the plurality of collector layer inputs to a single wave passage at a collector layer output to serve as a combined collector layer output. A detector receives the combined collector layer output from the single wave passage. A processor is configured for controlling the modulation layer and for receiving the detector output to generate an image based on the input light beam.

In still another system embodiment and associated method according to the present disclosure, an optoelectronic system includes a concentration layer including an array of optical concentrators, each optical concentrator including a concentrator input area and a concentrator output area that is smaller than the concentrator input area such that each concentrator concentrates a portion of an input light beam received at the concentrator input area into the concentrator output area. A modulation layer includes an array of light modulators that are spaced apart from one another in the modulation layer for modulating each portion of the input light with each light modulator having: (i) a modulator input area in optical communication with the concentrator output area of one of the optical concentrators, and (ii) a modulator waveguide for receiving the modulated portion of light and externally outputting the modulated portion of light. A collector waveguide defines a waveguide input for the modulator waveguide of each light modulator in the array of light modulators and the collector waveguide combines the outputted modulated portion of light from each light modulator with the outputted modulated portion of light from other ones of the light modulators in the array of light modulators to produce a collector waveguide output. A detector receives the collector waveguide output to produce a detector output. A processor is configured for controlling the modulation layer and for receiving the detector output to generate an image based on the input light beam.

In yet another system embodiment and associated method according to the present disclosure, an optoelectronic system includes a plurality of spatial light modulation sub-modules for receiving input light, modulating the input light to produce modulated light and outputting the modulated output light, the sub-modules supported in a side-by-side relationship. A combiner combines the modulated output light from two or more of the sub-modules to produce at least one combined output. At least one detector receives the combined output to generate a detector output. A processor is configured for controlling the plurality of spatial light modulation sub-modules and for receiving the detector output to generate an image based on the input light.

In another aspect of the present disclosure, an apparatus and associated method are described. The apparatus comprises a horn including a horn body having at least one horn sidewall defining a first opening that tapers down to a second opening in a direction of elongation such that the first opening includes a first area that is larger than a second area of the second opening and a port that is tubular and dimensionally uniform transverse to the direction of elongation and extends in the direction of elongation from a first port end that is in communication with the second opening to a second port end that defines an external opening, and the port includes at least one port sidewall extending from the first port end to the second port end surrounding a port cavity. A dielectric rod includes a rod length extending between a first rod end and a second rod end with the first rod end extending through the external opening of the second port end and into the port cavity such that the first rod end is in a spaced apart relationship from the port sidewall along the light path and the second rod end is configured for external communication along the light path such that the apparatus defines the light path in (i) one direction from the first opening of the horn body to the second rod end of the dielectric rod and (ii) an opposite direction from the second rod end of the dielectric rod to the first opening of the horn body.

In another aspect of the present disclosure, a method is described for producing an apparatus for use in a light path. The method includes configuring a horn to include (i) a horn body having at least one horn sidewall defining a first opening that tapers down to a second opening in a direction of elongation such that the first opening includes a first area that is larger than a second area of the second opening and (ii) a port that is tubular and dimensionally uniform transverse to the direction of elongation and extends in the direction of elongation from a first port end that is in optical communication with the second opening to a second port end that defines an external opening. The port is configured with at least one port sidewall extending from the first port end to the second port end surrounding a port cavity. A dielectric rod having a rod length extending between a first rod end and a second rod end is positioned such that the first rod end extends through the external opening of the second port and into the port cavity so that the first rod end is in a spaced apart relationship from the port sidewall configuration along the light path and the second rod end is arranged for external communication such that the light path is defined in (i) one direction from the first opening of the horn body to the second rod end of the dielectric rod and (ii) an opposite direction from the second rod end of the dielectric rod to the first opening of the horn body.

In yet another aspect of the present disclosure, a horn is described for use in a light path. The horn includes a horn body having at least one horn sidewall defining a first opening that tapers down to a second opening in a direction of elongation such that the first opening includes a first area that is larger than a second area of the second opening and a port that is tubular and dimensionally uniform transverse to the direction of elongation and extends in the direction of elongation from a first port end that is in optical communication with the second opening to a second port end that defines an external opening, and the port includes at least one port sidewall extending from the first port end to the second port end surrounding a port cavity for optical communication on the light path between the first opening of the horn body and the second port end of the port.

BRIEF DESCRIPTIONS OF THE DRAWINGS

Example embodiments are illustrated in referenced figures of the drawings. It is intended that the embodiments and figures disclosed herein are to be illustrative rather than limiting.

Figure 4:
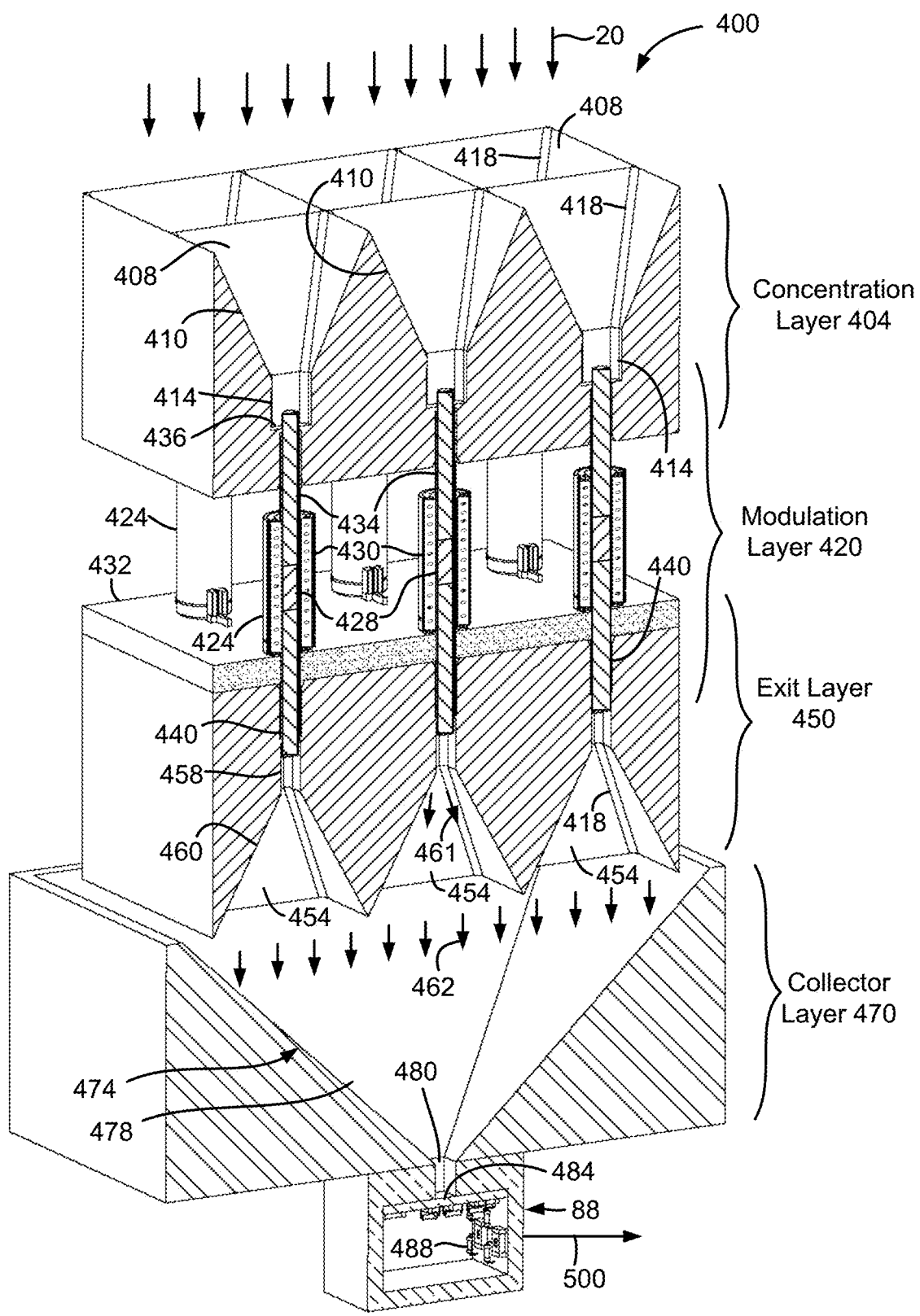
FIG. 4 is a diagrammatic partially cutaway view, in perspective, of another embodiment of an optoelectronic system produced in accordance with the present disclosure.
Figure 5:
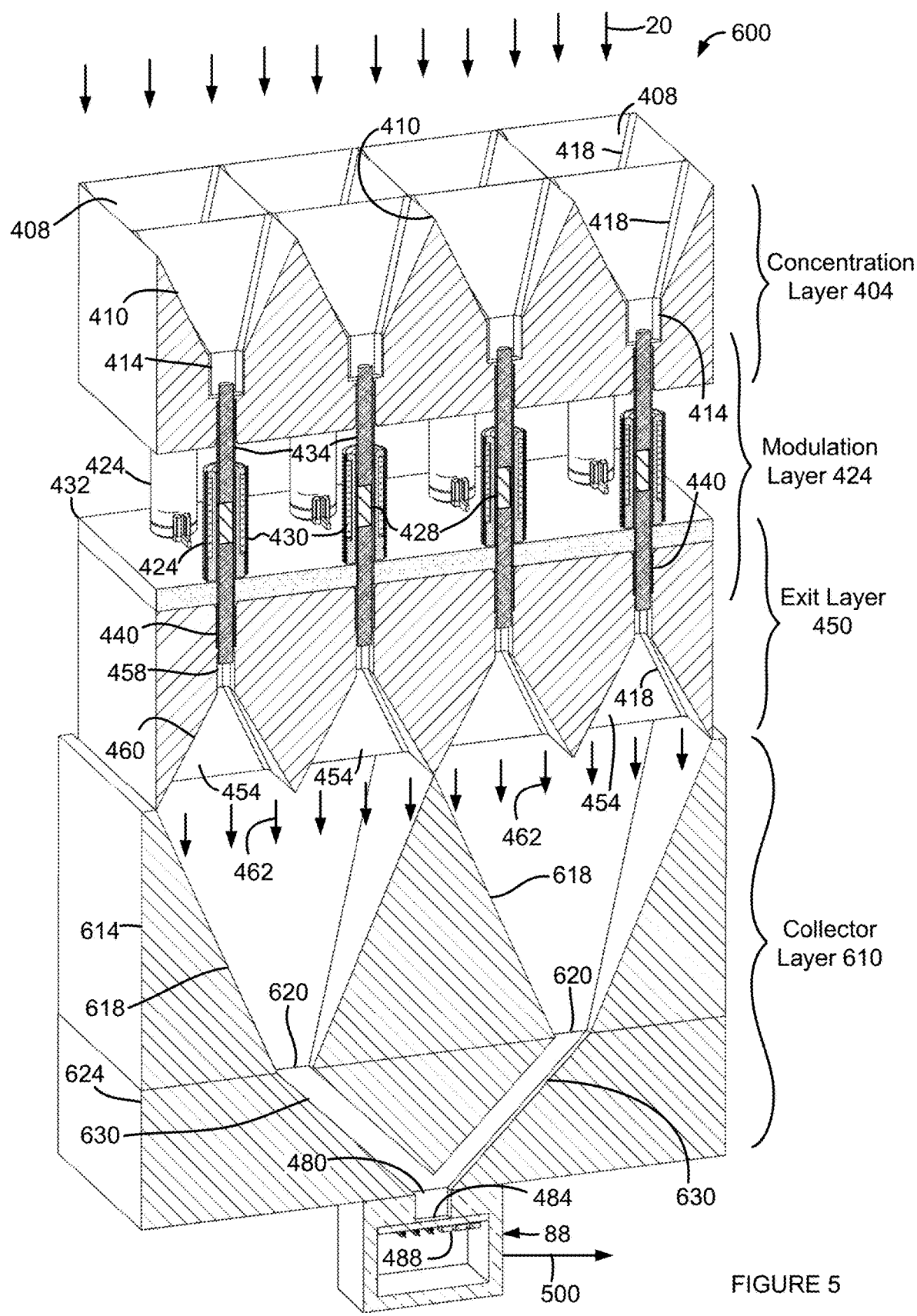

FIG. 5 is a diagrammatic partially cutaway view, in perspective, of another embodiment of an optoelectronic system produced in accordance with the present disclosure and which resembles the structure of the optoelectronic system of FIG. 4 with the exception of a plurality of horns in a first section of a collector layer that couple to a second section of the collector layer to guide the modulated light to a detector.

Figure 6:
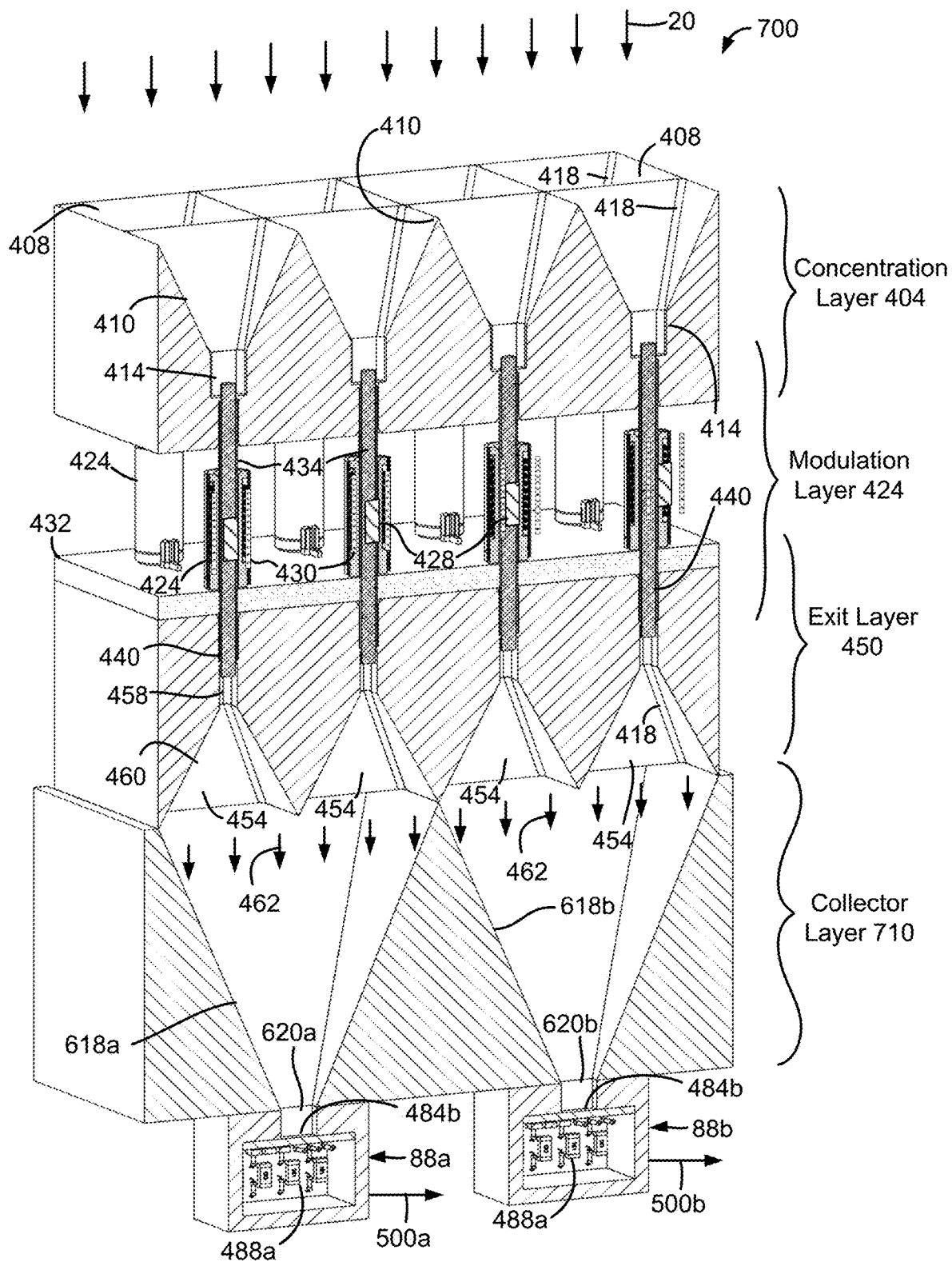

FIG. 6 is a diagrammatic partially cutaway view, in perspective, of another embodiment of an optoelectronic system produced in accordance with the present disclosure and which resembles the structure of the optoelectronic system of FIG. 4 with the exception of a plurality of horns in the collector layer which couple modulated light to a plurality of detectors.

Figure 7A:
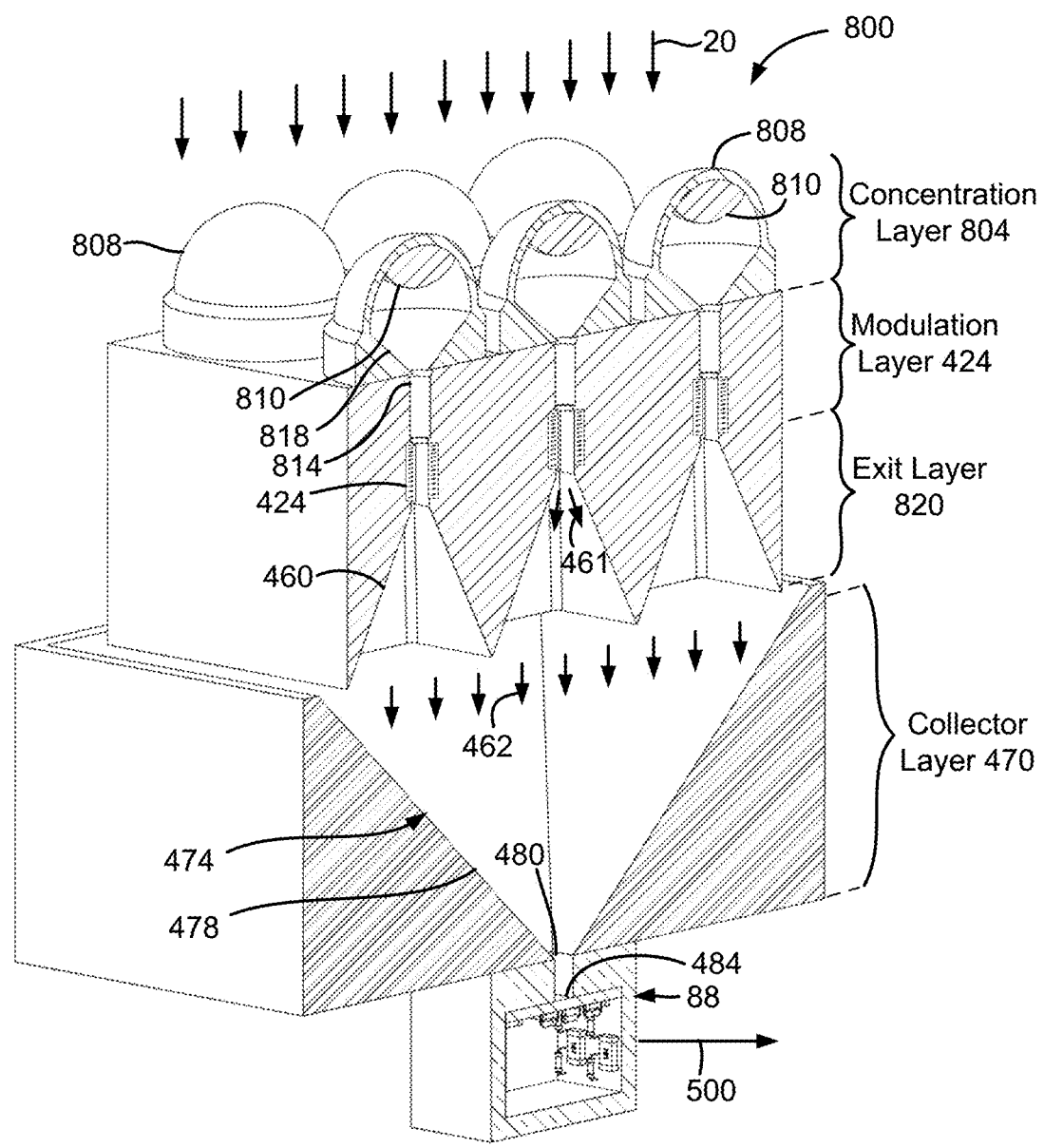

FIG. 7a is a diagrammatic partially cutaway view, in perspective, of another embodiment of an optoelectronic system produced in accordance with the present disclosure in which a concentration layer is made up of an array of lenses.

Figure 7B:
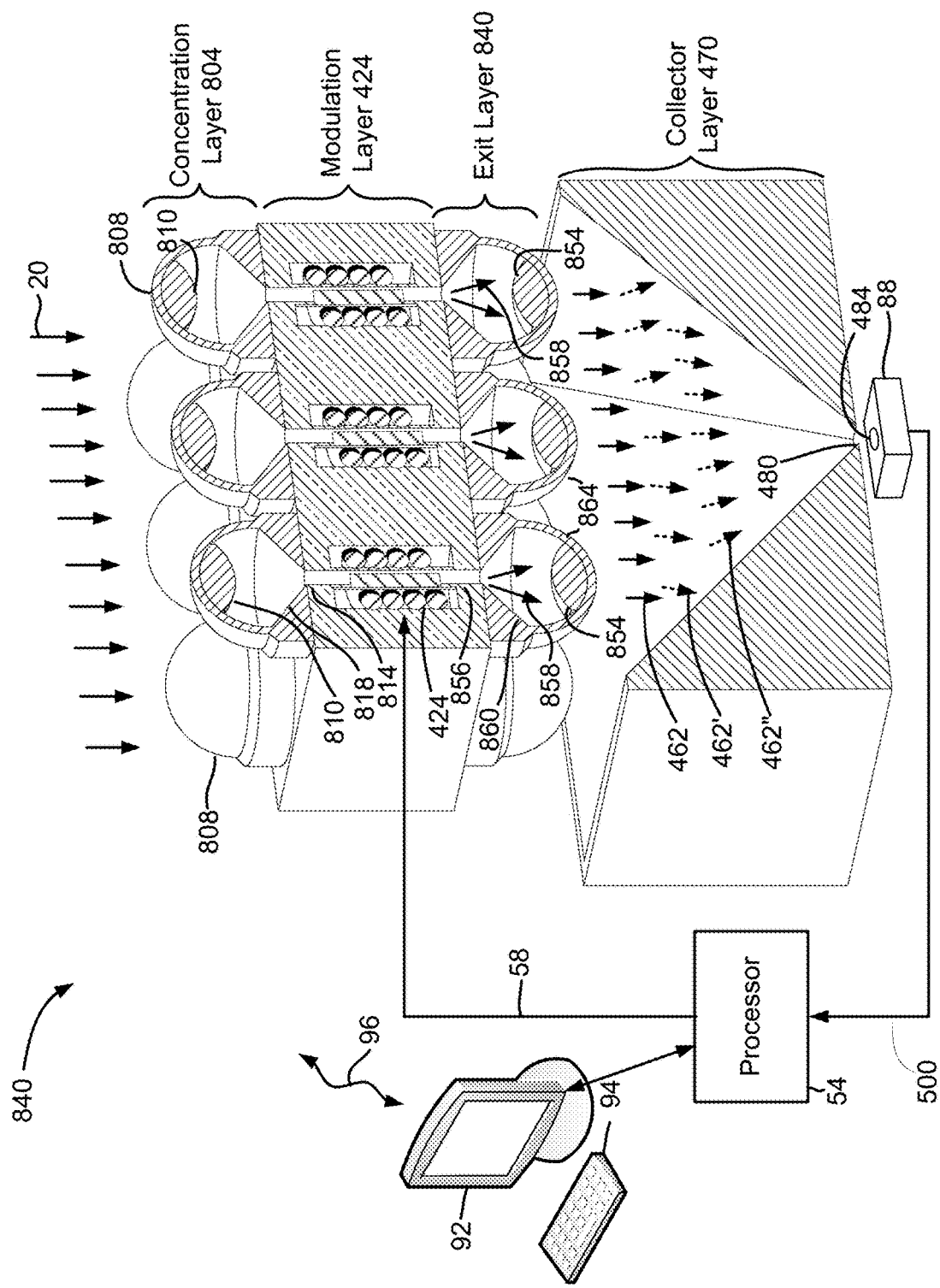

FIG. 7b is a diagrammatic partially cutaway view, in perspective, of another embodiment of an optoelectronic system produced in accordance with the present disclosure and which resembles the optoelectronic system of FIG. 7a except that the exit layer, like the concentration layer, is made up of an array of lenses.

Figure 8:
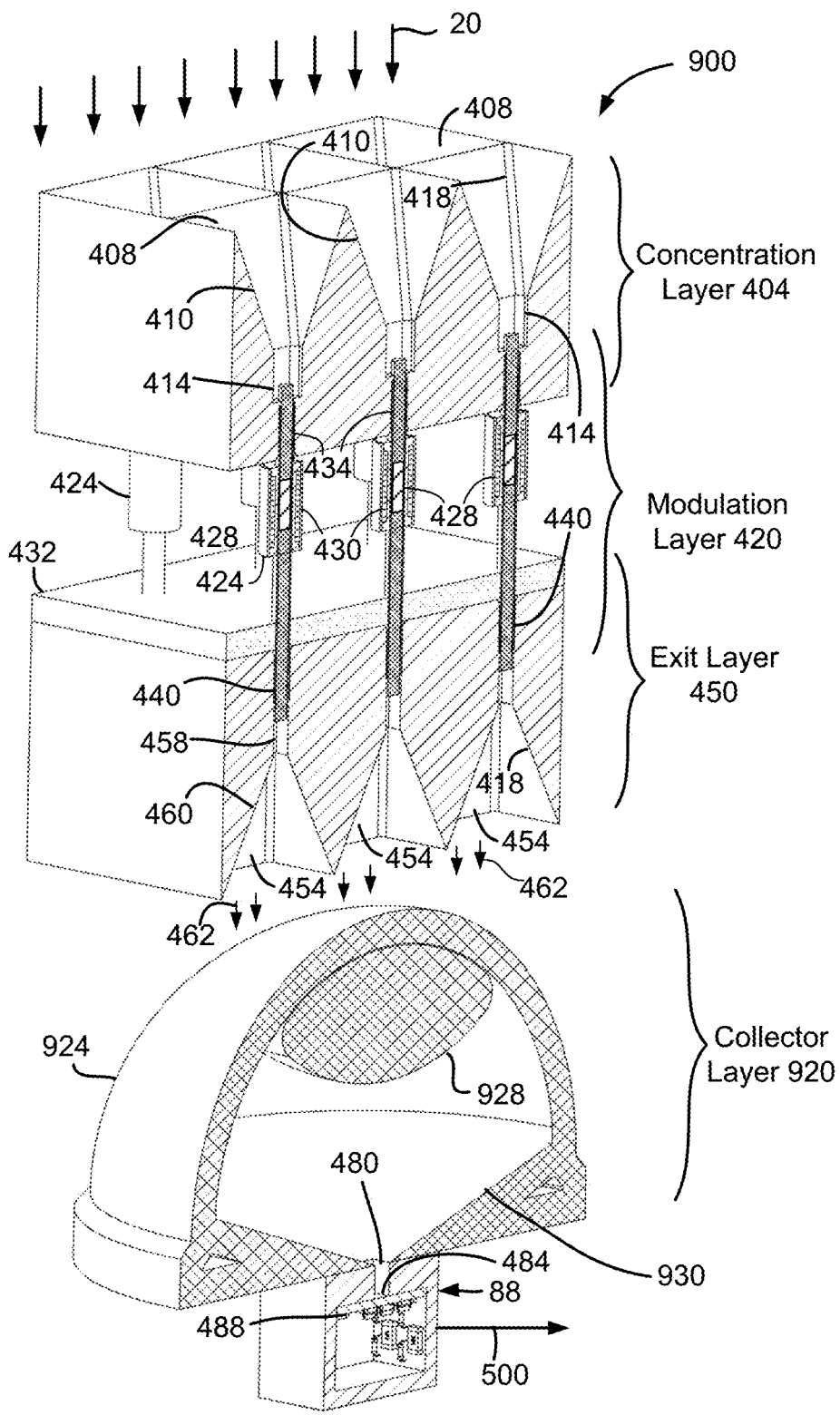

FIG. 8 is a diagrammatic partially cutaway view, in perspective, of another embodiment of an optoelectronic system produced in accordance with the present disclosure and which resembles the optoelectronic system of FIG. 4 except that a lens serves as the collector layer.

Figure 9A:
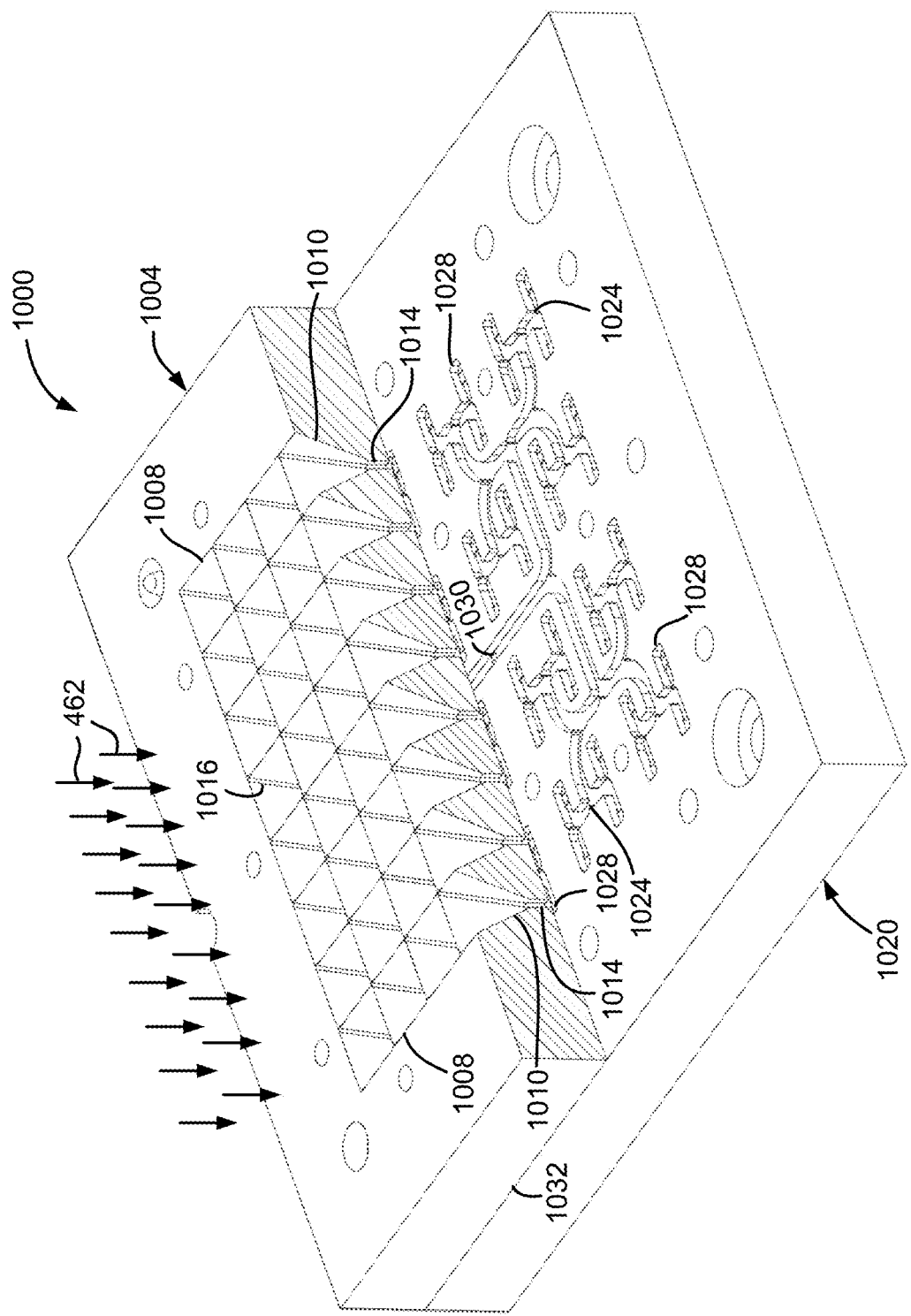

FIG. 9a is a diagrammatic partially cutaway view, in perspective, of a collector layer produced in accordance with the present disclosure utilizing an array of horns and a collector waveguide and which can be used at least in place of the collector layers used in the optoelectronic systems of FIGS. 4, 5, 7 and 8.

Figure 9B:
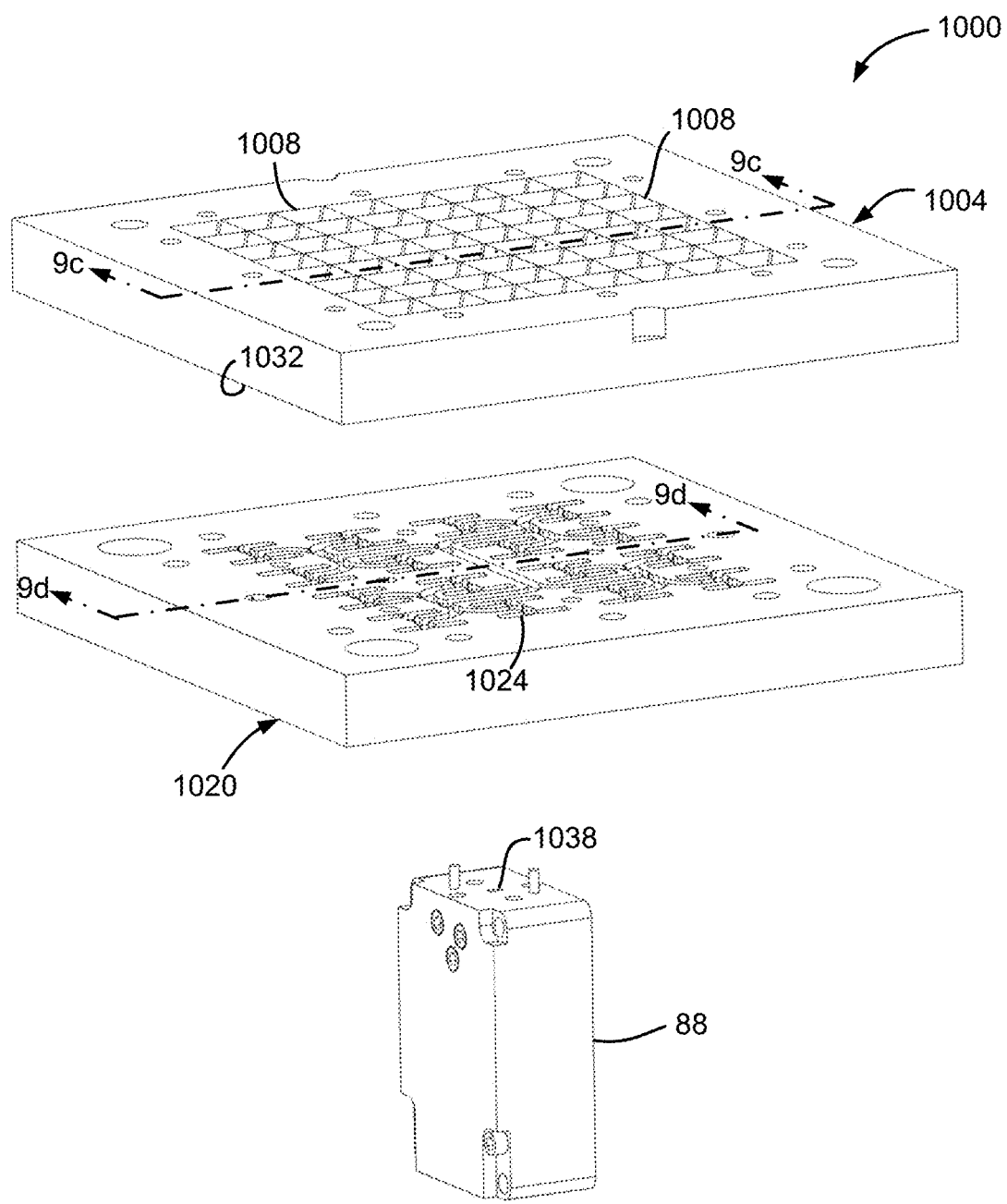

FIG. 9b illustrates additional details with respect to the collector layer of FIG. 9a in a diagrammatic exploded view, in perspective, and in relation to a detector.

Figure 9C:
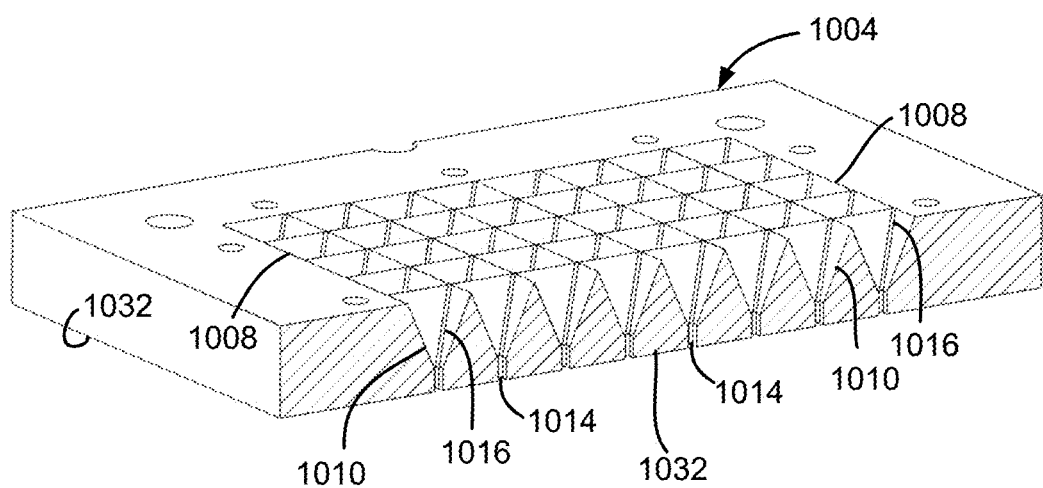
Figure 9D:
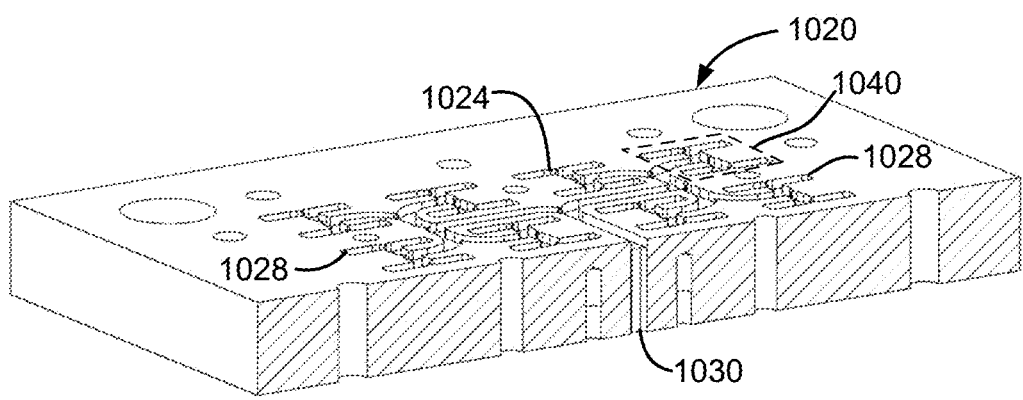

FIGS. 9c and 9d illustrate additional details with respect to the collector layer of FIGS. 9a and 9b in diagrammatic partially cutaway perspective views, showing the horn layer and the collector waveguide, respectively, in isolation.

Figure 9E:
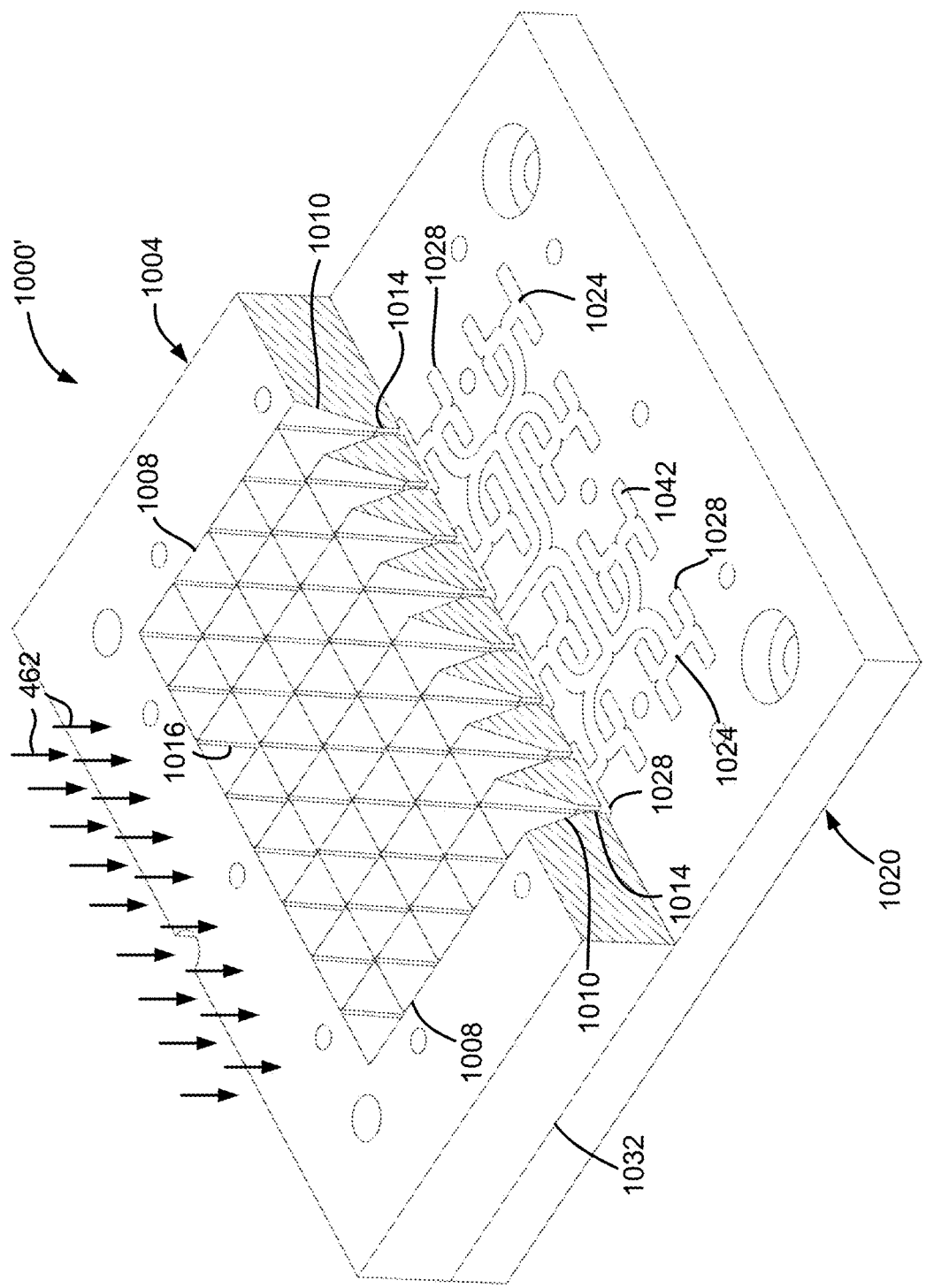

FIG. 9e is a diagrammatic partially cutaway view, in perspective, of another collector layer which resembles the collector layer shown in FIGS. 9a-9d with the exception that passages of the collector waveguide are filled with a dielectric material.

Figure 9F:
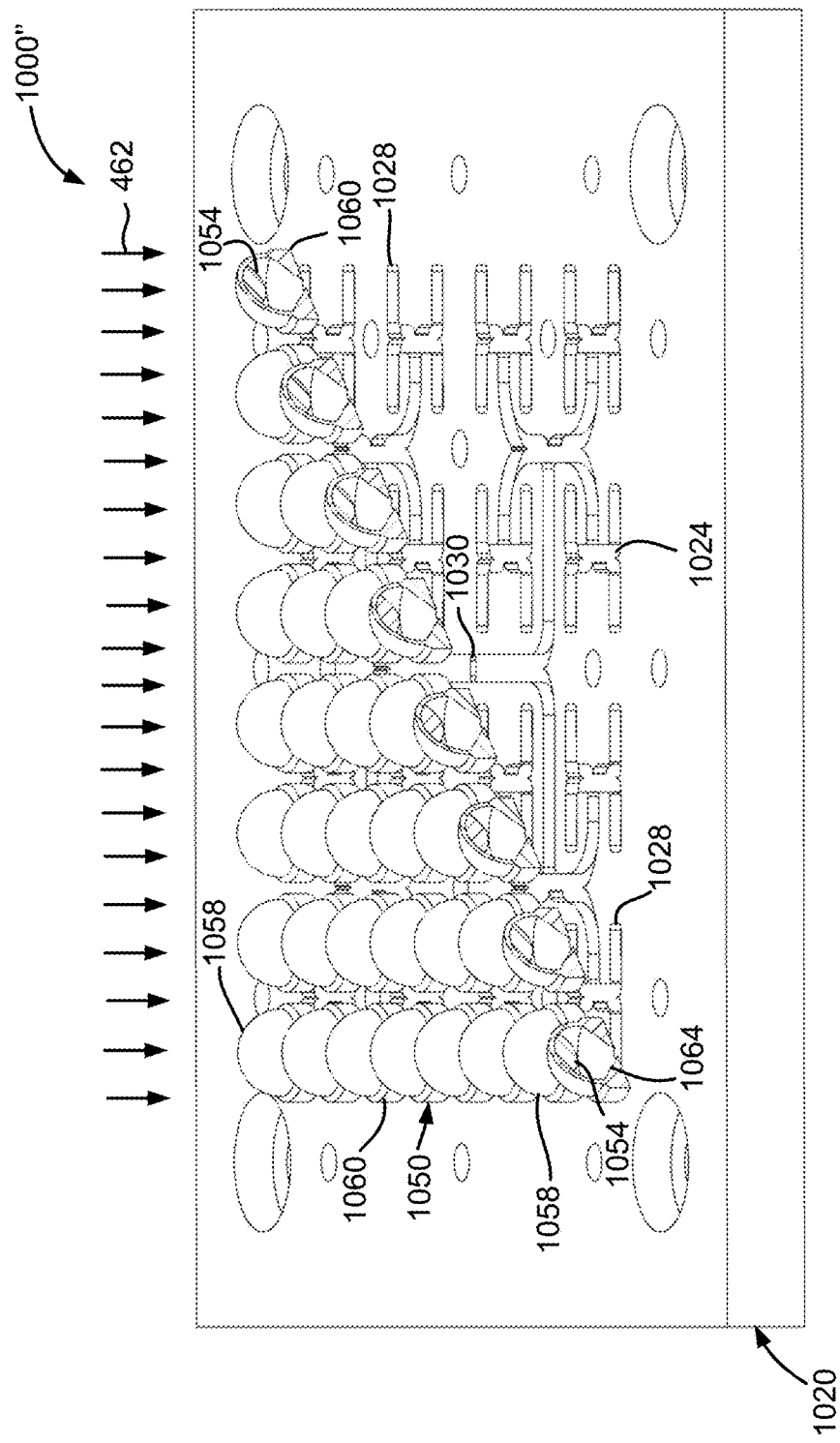

FIG. 9f is a diagrammatic partially cutaway view, in perspective, of another collector layer which resembles the collector layer shown in FIGS. 9a-9d with the exception that the array of horns has been replaced by an array of lenses and associated supports.

Figure 10:
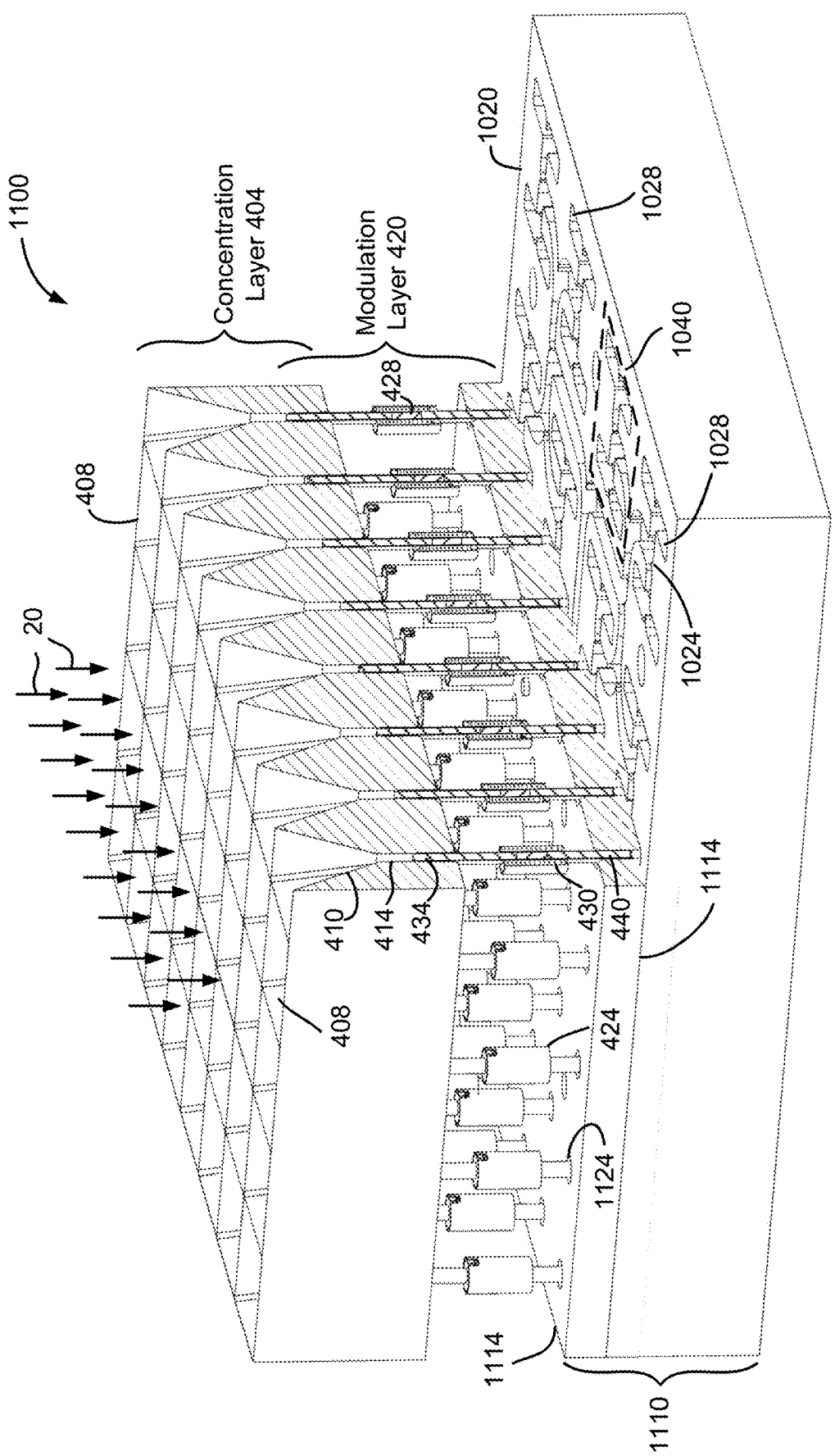

FIG. 10 is a diagrammatic partially cutaway view, in perspective, of another embodiment of an optoelectronic system produced in accordance with the present disclosure and which resembles the optoelectronic system of FIG. 4 at least given that that there is no exit layer since a dielectric post serves to transfer modulated light from each light modulator directly to a collector waveguide.

Figure 11:
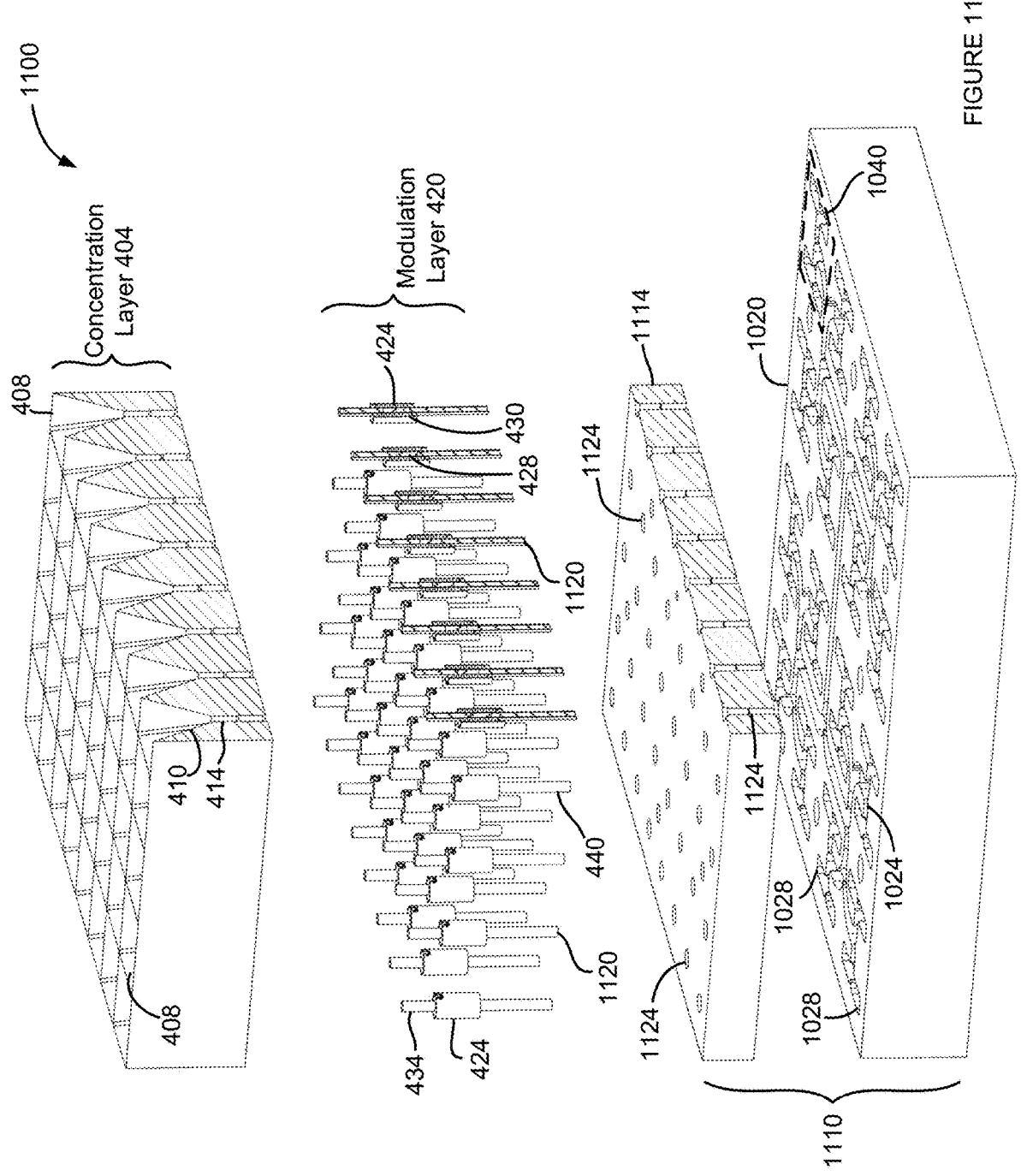

FIG. 11 is a diagrammatic partially cutaway and exploded view, in perspective, of the optoelectronic system of FIG. 10, shown here to illustrate additional details of its structure.

Figure 12:
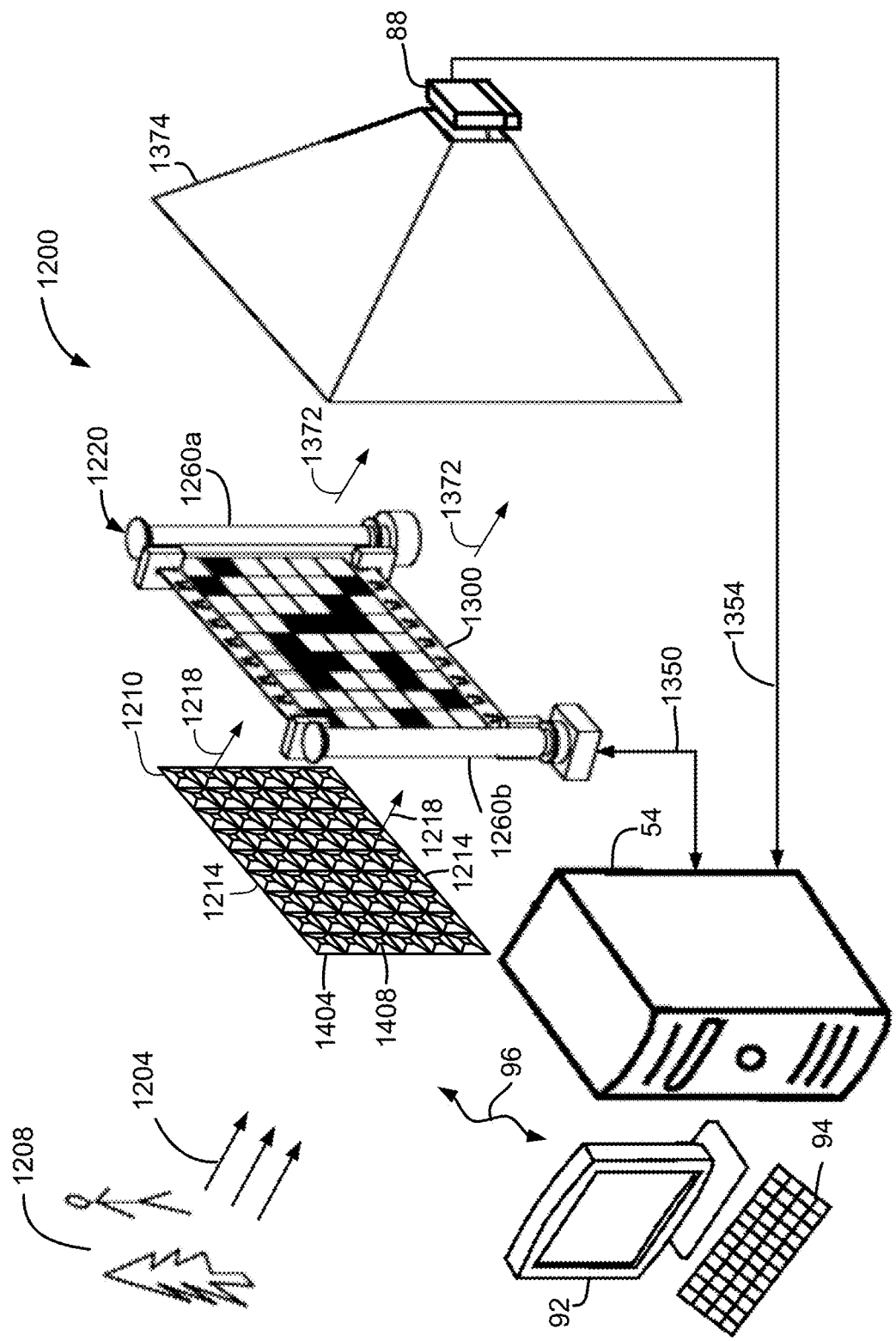

FIG. 12 is a diagrammatic view, in perspective, illustrating another embodiment of an optoelectronic system produced in accordance with the present disclosure including a spatial light modulator that receives input light from a concentration layer and subjects the concentrated light to blocking patterns produced using a flexible tape media.

Figure 13:
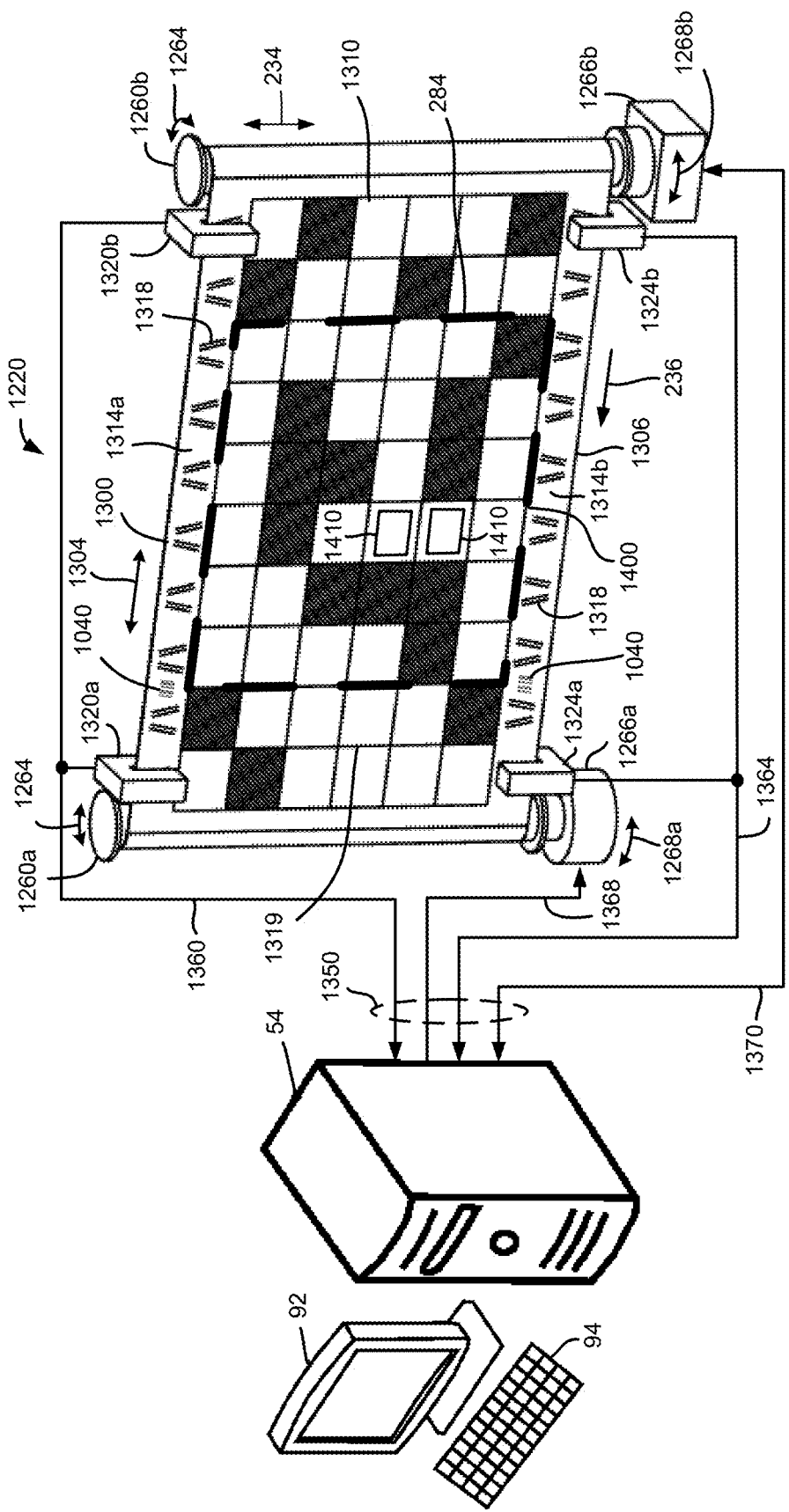

FIG. 13 is another diagrammatic view, in perspective, illustrating additional details with respect to the embodiment of FIG. 12, shown here to illustrate additional details of its structure and operation.

Figure 14:
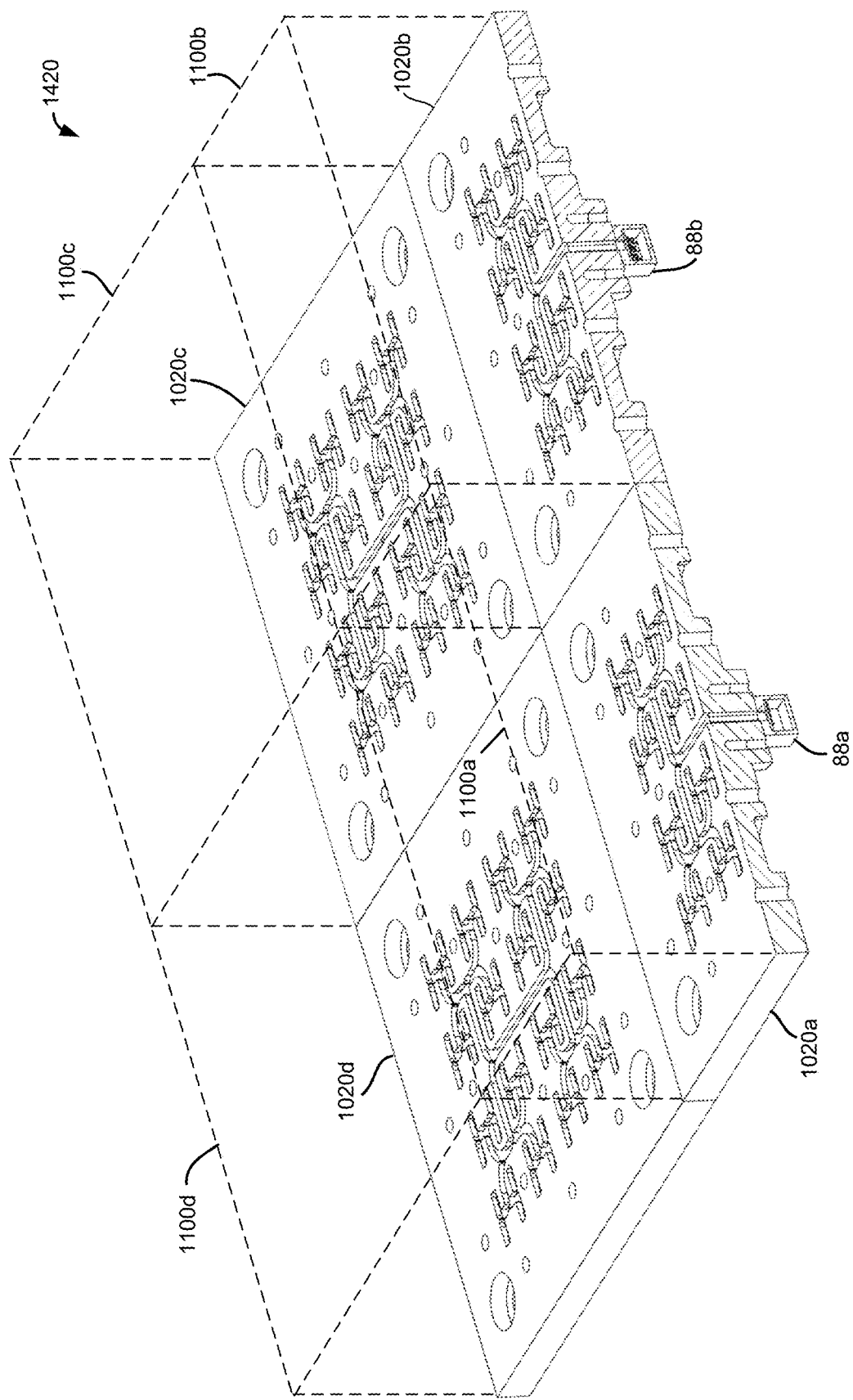

FIG. 14 is a diagrammatic partially cutaway view, in perspective, illustrating four collector waveguides side-by-side for use as part of an overall system including a detector associated with each collector waveguide.

Figure 15:
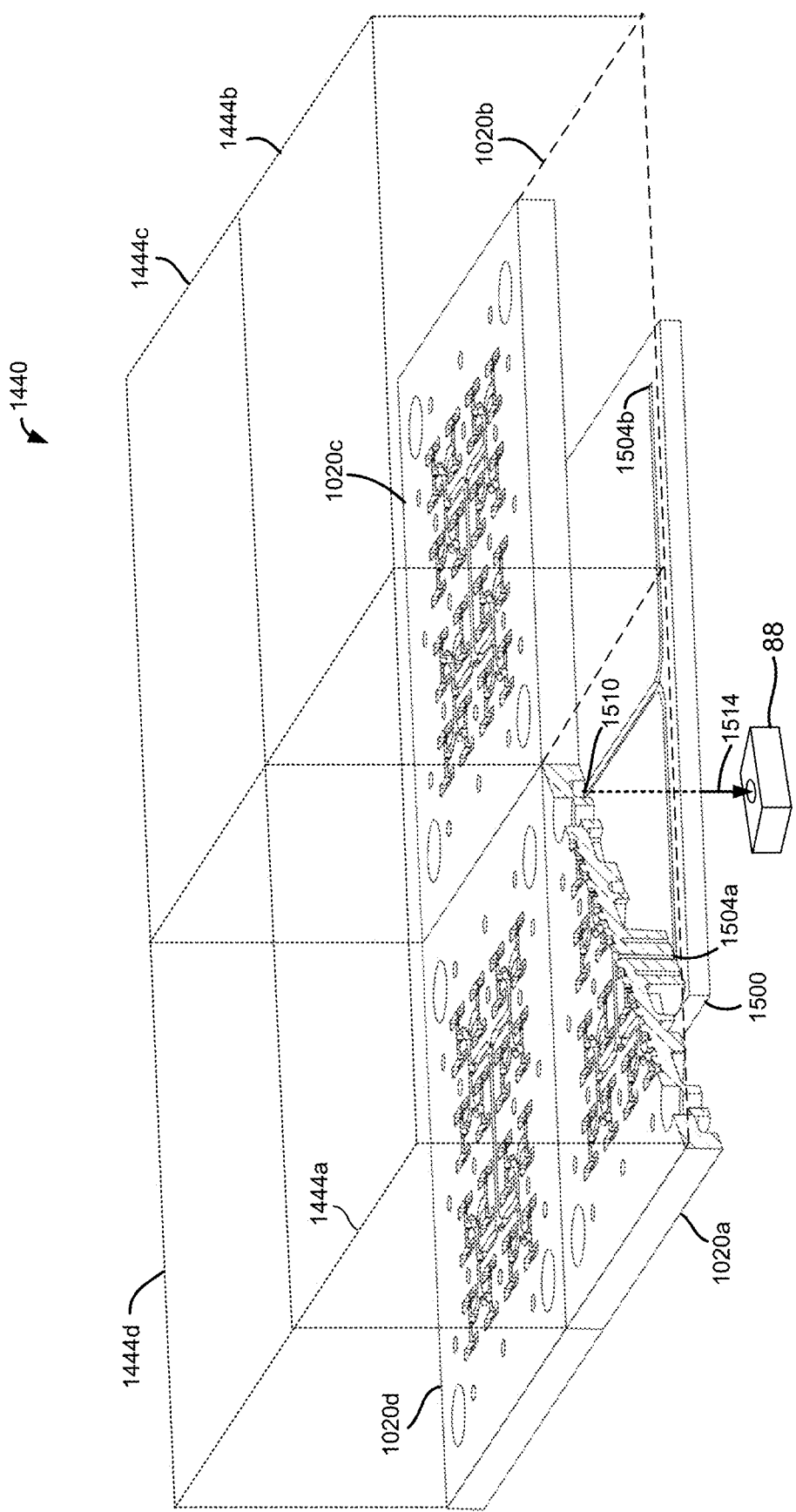

FIG. 15 is a diagrammatic partially cutaway view, in perspective, illustrating four collector waveguides side-by-side for use as part of an overall system including a supplemental waveguide that couples from the collector waveguides to a detector.

Figure 16:
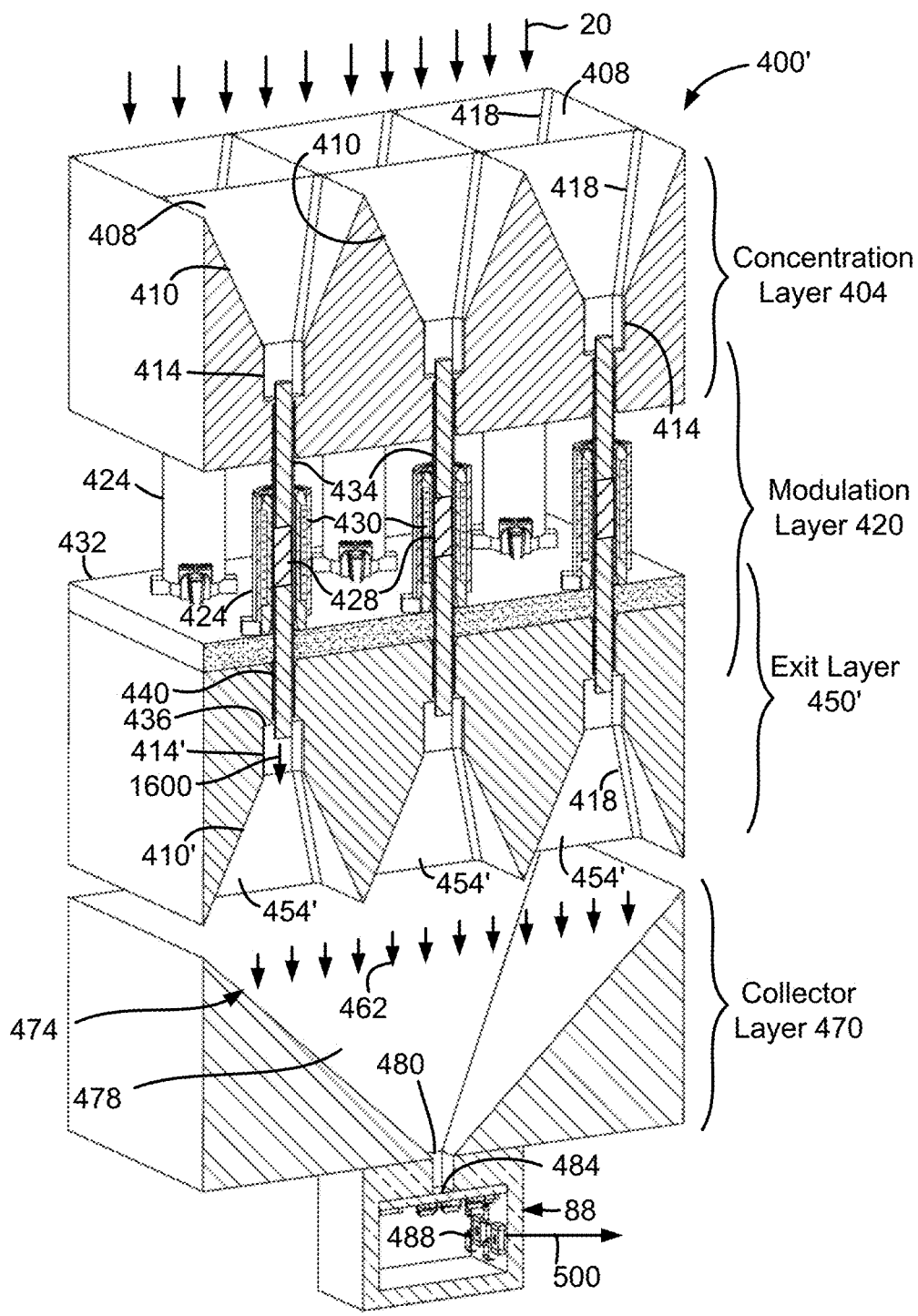

FIG. 16 is a diagrammatic cutaway view, in perspective, of a system produced in accordance with the present disclosure that is modified as compared to the system of FIG. 4.

Figure 17:
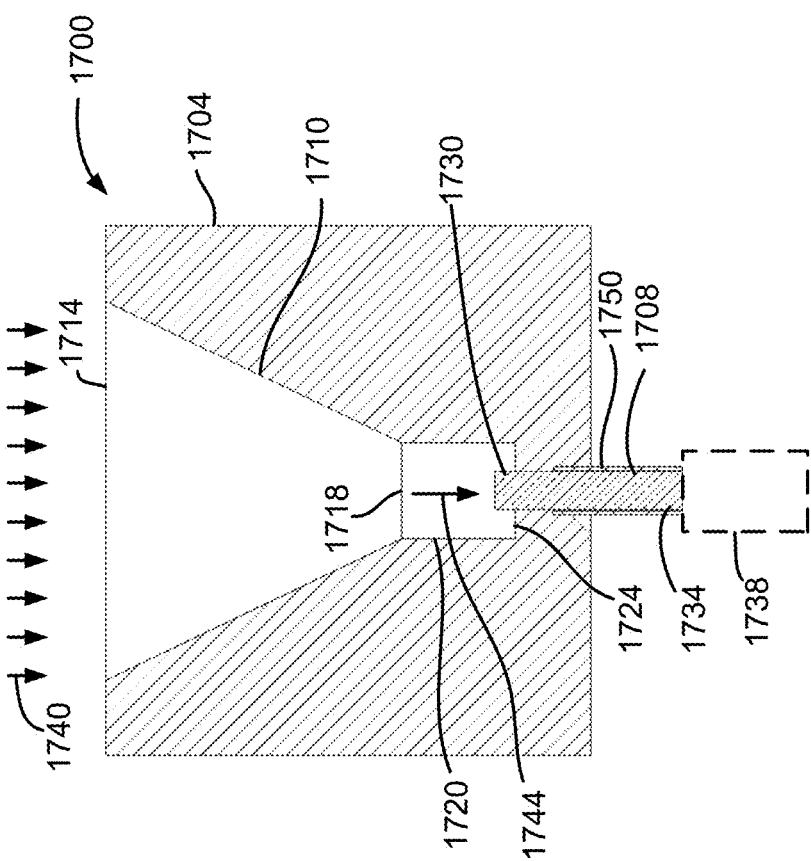

FIG. 17 is a diagrammatic partially cut-away view, in elevation, of a light path defining arrangement according to the present disclosure.

Figure 18:
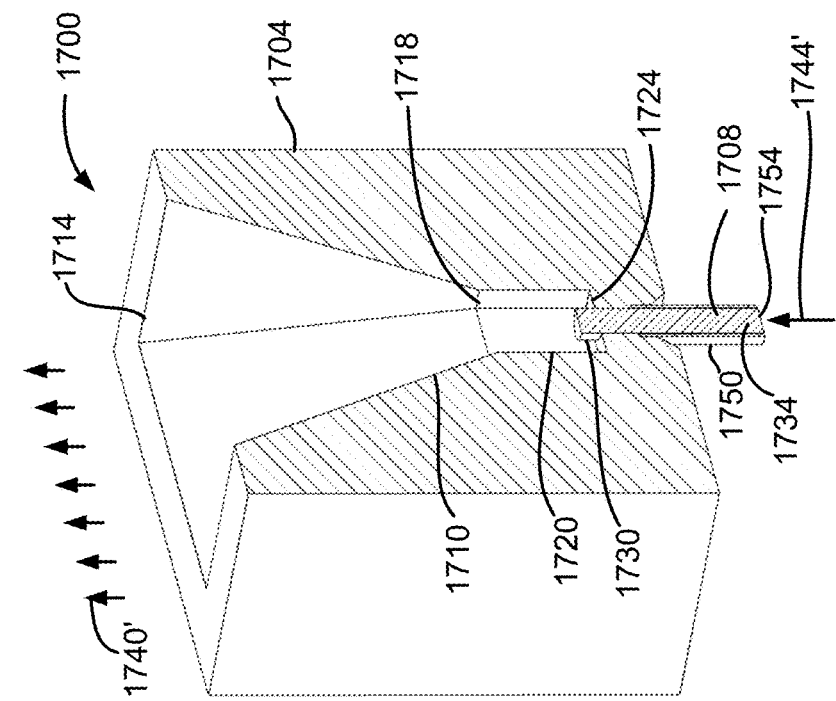

FIG. 18 is a diagrammatic partially cut-away view, in perspective, of the light path defining arrangement of FIG. 17, shown here to illustrate further details of its structure.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims.

Applicants hereby describe advanced passive or active imaging system architectures and associated methods which use spatial light modulation. Embodiments of the systems described herein support compressive sampling and imaging with electromagnetic waves (EMW) over a range of frequencies from 10 GHz to 10 THz (millimeter wave to terahertz spectrum), as well as over a range of frequencies from 30 GHz to 300 GHz (millimeter wave spectrum). In conjunction with a compressive sampling algorithm or other suitable algorithm for collecting data to render an image, disclosed systems comprise a millimeter wave imaging camera offering sweeping improvements over the state-of-the-art in millimeter wave imaging.

Turning now to the drawings, it is noted that the figures are not to scale and are diagrammatic in nature in a way that is thought to best illustrate features of interest. Descriptive terminology such as, for example, upper/lower, top/bottom, horizontal/vertical, left/right and the like, may be adopted with respect to the various views provided in the figures for purposes of enhancing the reader's understanding and is in no way intended to be limiting. All embodiments described herein are submitted to be operational irrespective of any overall physical orientation. It is noted that like reference numbers may be used to refer to like items throughout the various figures.

Figure 1:
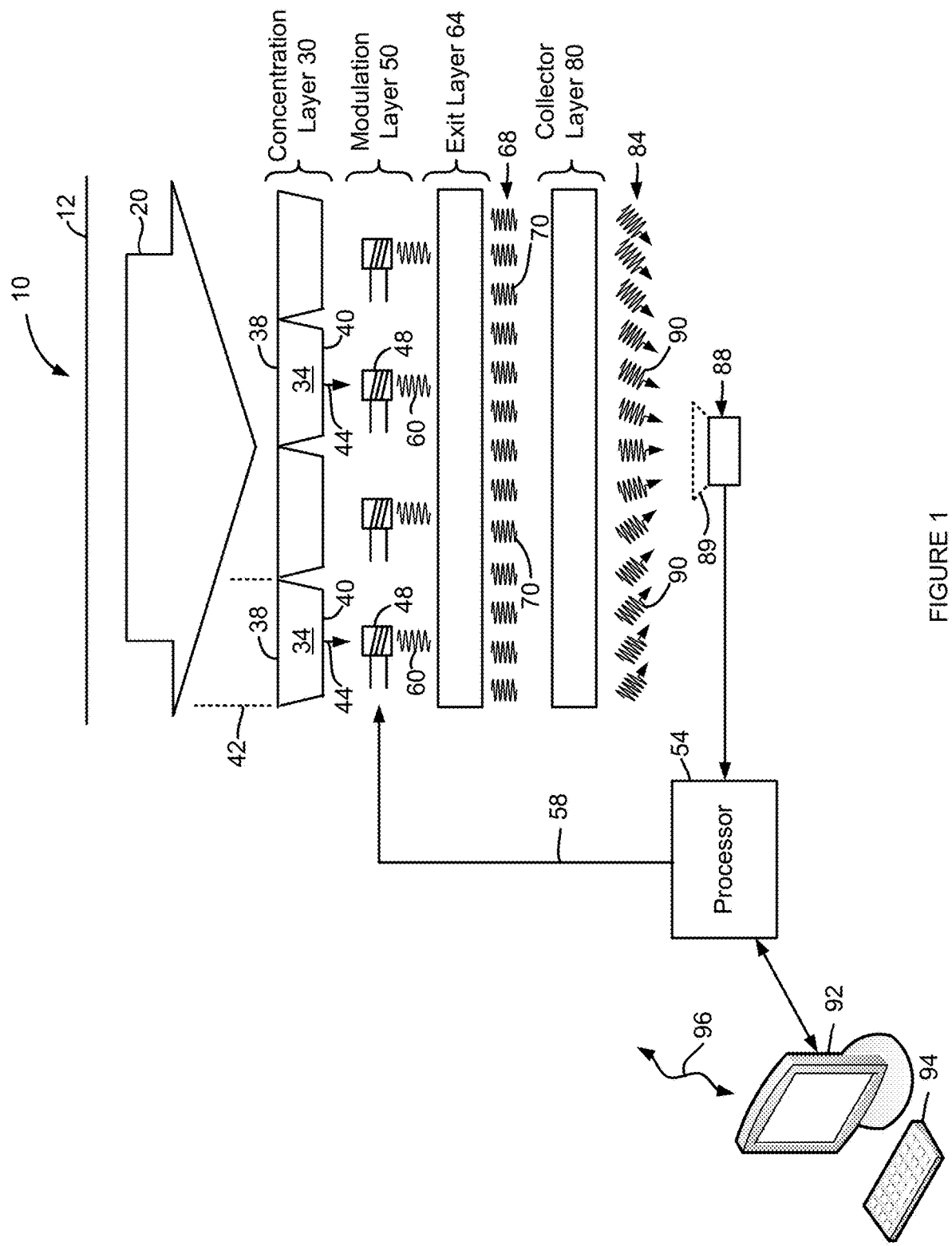
FIG. 1 is a diagrammatic view, in elevation, illustrating an embodiment of an optoelectronic system produced in accordance with the present disclosure.

FIG. 1 is a diagrammatic view illustrating an embodiment of an optoelectronic system, generally indicated by the reference number 10 and produced in accordance with the present disclosure. It is initially noted that suitable measures can be taken to enhance energy transfer between the various layers and components in the systems yet to be described. Such measures include but are not limited to impedance matching based on dimensional considerations, antireflective materials or layers, meta-materials, and permittivity of the materials used in the various components. System 10 is shown imaging a scene 12 that is laterally spaced away from the system and normal to the plane of the figure such that the scene is represented by a line. Input light or EMW 20 from the scene is represented as an arrow traveling toward a concentration layer 30. It is noted that scene 12 can be actively illuminated with light at a wavelength or range of wavelengths of interest, however, this is not a requirement. Embodiments of concentration layer 30 include an array of optical concentrators, diagrammatically shown as rectangles making up the concentration layer and several of which are individually designated by the reference number 34. From a functional perspective, each optical concentrator includes a concentrator input area 38 and a concentrator output area 40 that is smaller than the concentrator input area such that each concentrator concentrates a portion 42 (demarcated by dotted lines) of input light beam 20 received at the concentrator input area into one, respective concentrator output area 40. A concentrated output 44 is individually designated for several of the concentrators and represented by an arrow. Side-by-side rows and/or columns of the concentrator array can be offset with respect to one another in order to increase the relative amount of input light that is incident upon the concentrator input areas, for example, when the concentrator input areas are circular in shape. Of course, components of any subsequent layers can be arranged in a way that matches up or aligns with the arrangement of concentrators used in the concentration layer. While embodiments of the concentration layer will be described in detail below, it is initially noted that some embodiments externally transfer concentrated outputs 44 to an ambient environment or atmosphere surrounding the system such as, for example, air or the vacuum of space while other embodiments externally transfer concentrated outputs without emission into an ambient environment, for example, using a waveguide to conduct the concentrated outputs to a subsequent layer.

Still referring to FIG. 1, concentrated outputs 44 are received by individual modulators 48 that make up an array of modulators in a modulation layer 50. The array can be of any suitable dimensions in terms of width and length (i.e., rows and columns) transverse or normal to the direction of travel of input light 20 and concentrated outputs 44. It is noted that the array configuration can be carried from the concentration layer through the modulation layer and subsequent layers, as needed. Side-by-side rows and/or columns of the array can be offset with respect to one another. The modulators can be of any suitable type, either currently available or yet to be developed, that are electrically controllable by a processor 54 through a control line 58. Suitable types of modulators include but are not limited to magneto-optic, electro-optic such as Pockel cells, electrochromic, polarization modulation using graphene, mechanical shutters, metamaterial (see, for example, a publication by Claire M. Watts, et al., entitled Terahertz Compressive Imaging with Metamaterial Spatial Light Modulators, Nature Photonics, Vol. 8, August 2014). One suitable array of magneto-optic modulators is described as part of the spatial light modulator disclosed in U.S. Pat. No. 10,345, 631, entitled SOLID STATE SPATIAL LIGHT MODULATOR, which is hereby incorporated by reference. Other suitable modulators are disclosed in U.S. Published Patent Application no. U.S. 2021/0026168, entitled ADVANCED SPATIAL LIGHT MODULATORS, ASSOCIATED SYSTEMS AND METHODS, which is commonly owned with the present application. Each modulator provides a modulator output 60, several of which are individually designated. It should be appreciated that the output of the modulation layer can be characterized by a modulation layer spatial output distribution wherein such a distribution is established by the lateral distribution of the spaced apart modulator outputs 60 from the array of modulators. In the present example, the modulation layer spatial output distribution is non-uniform across the lateral extents of the modulation layer.

In the embodiment of FIG. 1, modulator outputs 60 are received by an exit layer 64. The latter serves to receive the modulation layer output having the modulation layer output spatial distribution. It is noted that the modulator outputs are, of course, modulated and shown as being equal in size (as may be the case throughout the various figures), although it is understood that this generally will not be the case due to the impressed modulation. For example, some of the modulators can be set to block the input light based on a particular blocking pattern that is being impressed on the modulators of the modulation layer. The exit layer further serves to remap or redistribute the modulation layer output spatial distribution to a modified spatial distribution 68 which, in the present example, is more uniform and wider in lateral extents than the modulation layer spatial output distribution. For illustrative purposes, the modified spatial distribution is shown as being made up of a plurality of uniformly distributed waves 70, several of which are individually designated. It is noted that waves 70 can be laterally uniformly distributed at least to a reasonable approximation. Modified spatial distribution 68 is then received by a collector layer 80. While some embodiments of the collector layer may best function when a more uniform modified spatial distribution is received, it should be appreciated that, in some embodiments, the exit layer can be configured to produce a modified spatial distribution that is customized to the requirements of the exit layer, such that the modified spatial distribution is not necessarily more uniform, in contrast with the manner illustrated.

Collector layer 80 serves to receive the modified spatial distribution to produce a collector layer output 84 that is directed to or focused toward a detector 88. The detector can be of any suitable type either currently available or yet to be developed including, but not limited to a tunnel diode type, Dicke-switched radiometer, and bolometer, and can be configured dependent upon the wavelength range that is of interest. It is noted that the detector can include a small impedance matching horn 89 which is shown in phantom using dotted lines, although this is not a requirement. The collector layer output is made up of a plurality of redirected waves 90, several of which are individually designated. In some embodiments, a plurality of detectors can be used with the collector layer customized to divide modified spatial distribution 68 into a portion for each detector. In some embodiments, exit layer 64 can cooperate with a customized collector layer by beginning to divide the modified spatial distribution into the portions that are to ultimately be received by detectors.

Under the control of processor 54, modulation layer 50 can be driven in any suitable manner while obtaining outputs from detector 88 for purposes of generating an image that can be presented on a display 92. An associated input device 94 allows an operator to provide inputs to processor 54. Of course, the image can readily be externally transferred, for example, through an Internet connection 96. In a compressive sensing embodiment, the modulation layer can be driven to produce a series of masks or blocking patterns with an output read from detector 88 in association with each blocking pattern. These outputs can then be used to generate an image on display 92. Prior art examples of blocking patterns include Hadamard patterns, although any suitable blocking patterns can be used. In this regard, the disclosed systems can even be configured to generate image data serially on a pixel-by-pixel basis in a way that mimics conventional imaging sensors such as, for example, a CMOS sensor which collects pixel values essentially in parallel.

Having described FIG. 1 in detail, it is noted that the various layers, at least from a functional perspective, are illustrated in a spaced apart relationship for illustrative clarity and for purposes of enhancing the reader's understanding. In some embodiments, however, it will be seen that some amount of physical overlap can be present with respect to adjacent functional layers.

Figure 2:
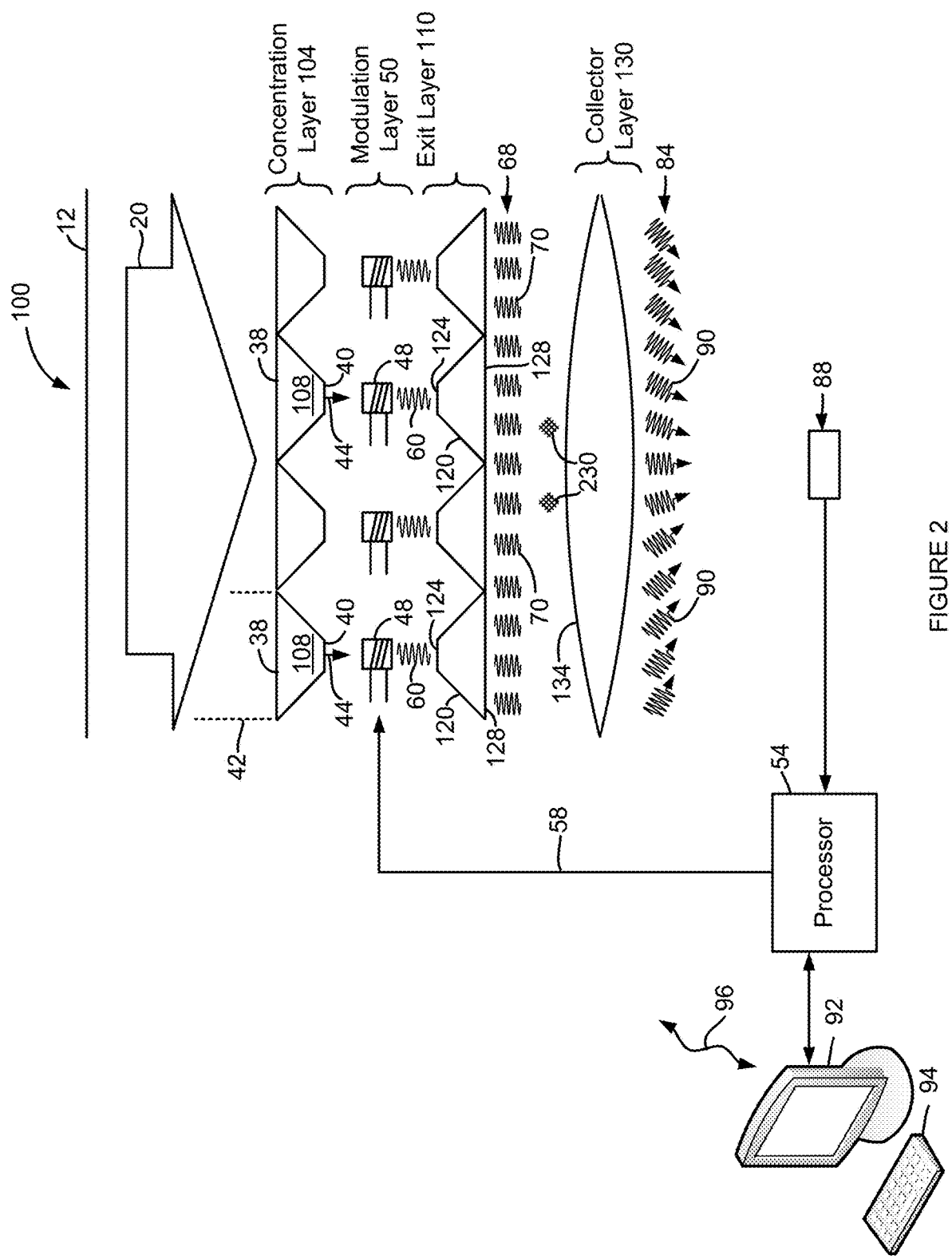
FIG. 2 is a diagrammatic view, in elevation, of another embodiment of an optoelectronic system produced in accordance with the present disclosure including a concentration layer and an exit layer each of which is made up of side-by-side horns and a lens serving as a collector layer.

FIG. 2 is a diagrammatic, more detailed illustration of an embodiment of a system produced in accordance with the present disclosure and generally indicated by the reference number 100. In this embodiment, a concentration layer 104 is made up of side-by-side individual horns 108. Each horn of the present embodiment, as well as the horn(s) of other embodiments described throughout the present disclosure, can include any suitable cross-sectional shape such as, for example, circular. In this example, the individual horns are frustoconical. Another suitable cross-sectional shape is rectangular which also encompasses a square shape. Any suitable shape can also be used for the sidewall(s) along the length of each horn 108. For example, the straight sidewalls of a frustoconical or truncated cone shape can be used. As another example, the sidewalls can include a nonlinear, curved or arcuate shape.

The horns described throughout this disclosure can be configured to respond to different polarities of light. For example, a square or rectangular horn is more responsive to a linear polarization, thereby partially acting as a polarizer in addition to the concentration layer. A circular horn is more responsive to all polarizations, thereby only concentrating the light.

An exit layer 110 includes an array of side-by-side individual horns 120 having an entrance opening 124 facing the modulation layer and a relatively larger exit opening 128 at an opposing end. It is noted that there is no requirement for horns 120 of exit layer 110 to be of the same size and/or shape as horns 108 of the concentration layer. In the present embodiment, horns 120 are configured to emit uniformly distributed waves 70 although other configurations of the horns can produce a non-uniform distribution, if needed. It is also noted that a one-for-one correspondence between horns 120 and modulators 48 is not required such that one horn can receive the output from a plurality of modulators.

Still referring to FIG. 2, a collector layer 130 includes a convex or converging lens 134 that is configured to receive uniformly distributed waves 70 and focus redirected waves 90 on detector 88 which is positioned to place the detector at least approximately at a focal point of the lens. Lens 134 can be formed in any suitable manner from any suitable material including, but not limited to high density polyethylene.

Figure 3:
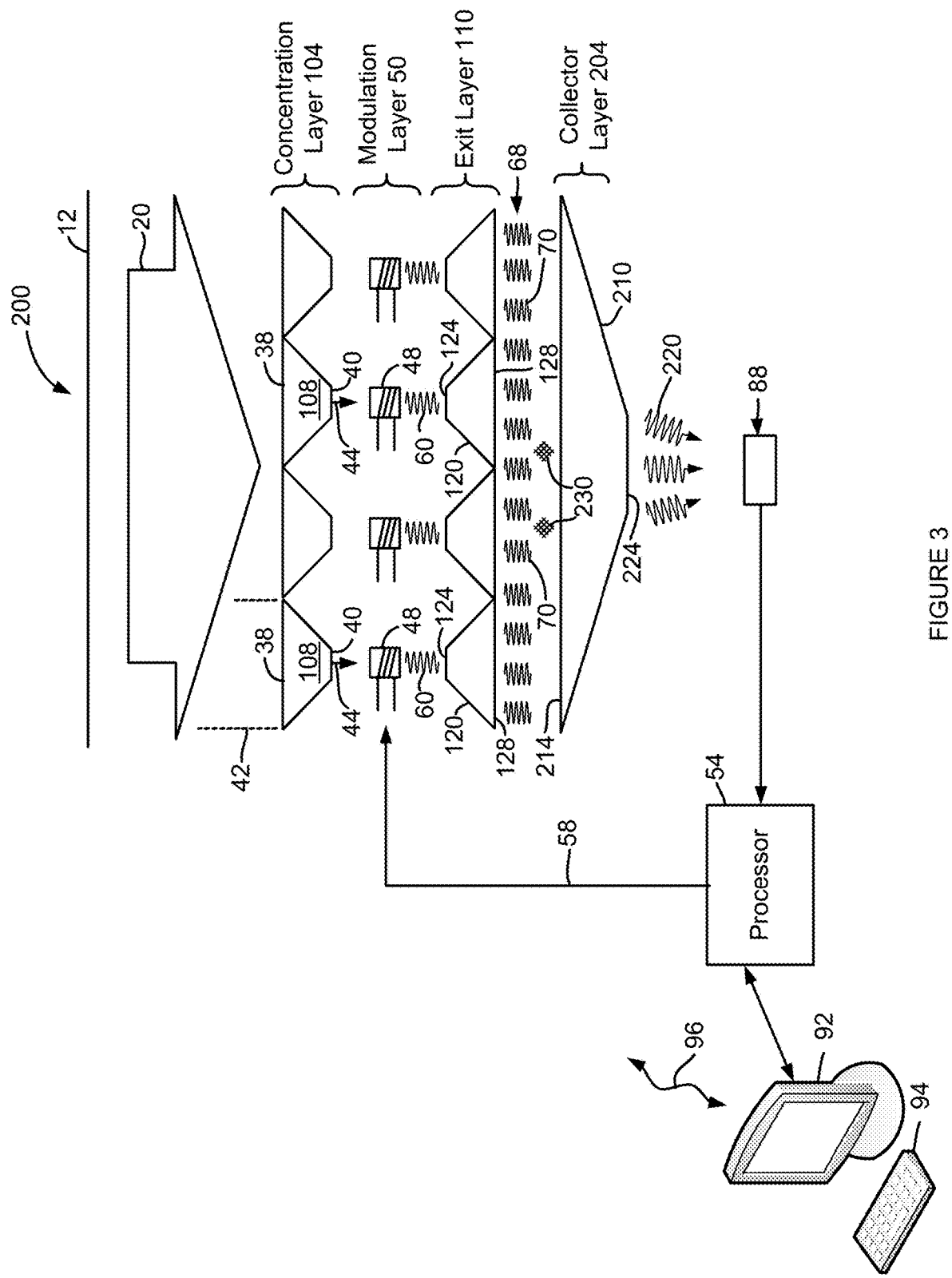
FIG. 3 is a diagrammatic view, in elevation, of another embodiment of an optoelectronic system produced in accordance with the present disclosure and which resembles the optoelectronic system of FIG. 2 except that a horn serves as the collector layer.

FIG. 3 is another diagrammatic, more detailed illustration of an embodiment of a system produced in accordance with the present disclosure and generally indicated by the reference number 200. It is noted that system 200 replicates the structure of system 100 with the exception that, in this embodiment, a collector layer 204 includes a collector horn 210 having an input 214 which receives uniformly distributed waves 70 and produces output waves 220 at an output 224 that travel to detector 88. As shown, input 214 is larger in lateral extents than output 224. Collector horn 210 can be formed in any suitable manner from suitable materials including, but not limited to brass, aluminum, steel, or metal-coated plastic, such as nickel-plated plastic. In some embodiments, there is no interstitial space present between the output of collector horn 210 and the input of detector 88, although this is not a requirement. The collector horn can be any suitable shape in its lateral extents, for example, based on the lateral extents of exit layer 110 and modulation layer 50.

Still referring to FIG. 3 and in some embodiments, a medium 230 (only partially shown) can be present in an interstitial space (i.e., interstice) between exit layer 110 and collector layer 204. While not a requirement, the medium can also be present in the body or interior cavity of horns 108 and/or in the body or interior cavity of horn 210 of the collector layer. It is noted that suitable coatings can be applied to any outwardly facing surface(s) of the medium for purposes of impedance matching such as, for example, an antireflective coating. Suitable materials for medium 230 include but are not limited to mylar, HDPE, multi-layer materials, and any other material(s) that is substantially transmissive at desired wavelength(s) and has a dielectric constant larger than 1. It is noted that the interior cavity of any of the horns described throughout this disclosure can contain a medium and appropriate coatings. Referring briefly again to FIG. 2, medium 230 can be present in a similar manner between horns 120 and lens 134, although this is not a requirement.

Attention is now directed to FIG. 4 which is a diagrammatic cutaway view, in perspective, of a system produced in accordance with the present disclosure and generally indicated by the reference number 400. Input light 20 is illustrated as a series of arrows. It is noted that the basic structure of system 400 resembles that of system 200 of FIG. 3. System 400 includes a concentration layer 404 having an array of concentrator horns, several of which are individually designated by the reference number 408. It is noted that the dimensions of the arrays (i.e., rows and columns) carrying through the structure of system 400 can be of any suitable size, although FIG. 4 is representative of a 3×3 array in consideration that one-half of the structure has been cut-away in the view of the figure. Processor 54 has not been shown for purposes of illustrative clarity but is understood to be present. Each horn can include a main portion 410 and an exit port 414 extending from the main body that is tubular with a uniform cross-sectional shape and dimensions along the length of the exit port. It is noted that the term "tubular", as used herein, does not require a cylindrical shape but instead refers to any suitable cross-sectional shape. In the present embodiment, the main portion of each horn and the exit port are at least generally square in lateral cross-section with chamfered corners, although this is not required. In this regard, any suitable shape can be used for the main portion the horn which can be referred to as a horn body tapering from a first, larger opening to a second, smaller opening. For example, the horn body can be a frustum. In the illustrated embodiment, the horn body is a right frustum. The horn bodies and exit ports of the present example can also include chamfered corners 418, several of which are individually designated, although this is not a requirement. In another embodiment, the horn body can be frustoconical such that the lateral cross-sectional shape is circular. In this latter embodiment, the exit port can be cylindrical with a sidewall extending between upper and lower ends of the exit port in the view of the figure. The diameter of the smaller opening of the horn body can match the diameter of the exit port. The concentration layer can be integrally formed from a single layer of a suitable material such as, by way of non-limiting example, brass, aluminum, steel, or metal-coated plastic. In other embodiments, the horn body and each corresponding exit port can be formed separately, for instance, by different material layers that are joined in a suitable manner.

A modulation layer 420 includes an array of modulators, several of which are individually designated by the reference number 424 in a one-to-one correspondence with concentrator horns 408. Each modulator 424, by way of non-limiting example, includes a Faraday element 428 that is surrounded by an electrical coil 430. A printed circuit board 432 can carry control signals from processor 54 (see FIG. 4) to the coil of each modulator for control purposes. An upper dielectric post 434 can include a cylindrical shape with one end received within the exit port of one of horns 408 and an opposing end received in a central aperture of coil 430 adjacent to Faraday element 428. In the present example, the lateral cross-sectional shape of exit port 414 is square while the lateral cross-sectional shape of the upper dielectric rod is circular. It is noted that this is not a requirement. For example, the lateral cross-sectional shape of the exit port can be circular, particularly when the horn body is frustoconical. Thus, the shape of the exit port sidewall can be complementary to the shape of the sidewall of the dielectric rod at least to the extent that the dielectric rod extends into the exit port to provide a confronting relationship. In an embodiment, the upper end of dielectric post 434 can extend through the exit port and into main portion 410. In another embodiment, as illustrated, the upper end of the dielectric rod does not extend into main portion 410 (i.e., the horn body). In this embodiment, the upper end of the dielectric post extends through a floor 436 of the exit port and the sidewall of the dielectric post is in a spaced apart, non-contacting relationship with the sidewalls that define the exit port. A lower dielectric post 440 can also include a cylindrical shape with one end received in the central aperture of coil 430 adjacent to an opposite end of Faraday element 428. A lower, opposite end of dielectric post 440 can be received within an exit layer, as will be described below. In an embodiment, the dielectric post can include a peripheral outline(s) that is complementary to the component in which it is received. As noted above, the dielectric posts can be jacketed by a layer of electrically conductive material or unjacketed. Further, dielectric posts in embodiments of the disclosure can be of any suitable shape in lateral extents and are not limited to a cylindrical shape. Such dielectric posts can be unjacketed dielectric material or a jacketed dielectric material. Insofar as workable dielectric materials are concerned, any material that has a dielectric constant greater than the surrounding atmosphere or ambient can be utilized. Suitable materials include but are not limited to alumina, ferrite, and HDPE. For use as the jacket, any suitable conductive material can be used, such as, for example, aluminum, stainless steel, nonmagnetic steel, gold, gold-plated plastic or plastic coated with nickel and then gold.

Still referring to FIG. 4, an exit layer 450 is partially cutaway to reveal the structure of one row of three exit horns 454. The structure, in this example, is used to support printed circuit board 432. In an embodiment, the exit layer can be a mirror image of concentration layer 404, although this is not a requirement and is not the case in the present embodiment. Such a mirror image embodiment will be described in further detail at an appropriate point hereinafter. Each exit horn 454 includes an entrance port 458 and a main portion 460 such that a lower end of each lower dielectric post 440 is received within entrance port 458 of one of exit horns 454. It is noted that collimation can be enhanced by horns 460, or any horn for that matter, by making the horn relatively longer along the propagation direction and/or relatively more narrow transverse to the propagation direction. Thus, uncollimated modulated light 461 can be collimated as the light travels through the horn. In some embodiments, the lower end of dielectric post 440 can extend into main portion 460. In the present embodiment, exit horns 454 are of the same general configuration as concentration layer horns 408, however, entrance ports 458 include lateral extents that are of reduced dimensions as compared to exit ports 414 of the concentration layer. In a manner that is consistent with the illustration of FIGS. 1 and 3, the output from exit layer 450 will have a distribution 462 (represented by arrows) that can be more uniform laterally than the modulated distribution from modulators 424 of modulation layer 420. Like concentration layer 404, exit layer 450 can be integrally formed from a suitable material, although this is not a requirement. Distribution 462 is received by a collector layer 470. In the present embodiment, the collector layer includes a single collector horn 474 that couples the light of the distribution to detector 88 via a main portion 478. Detector 88 can include an entrance aperture 480 which forms part of a housing for the detector. As noted, the latter can be any suitable type of detector or sensor including a sensing element 484 and support electronics 488 to produce an output 500 that can be used by a processor.

Referring to FIG. 5, a diagrammatic partially cutaway view, in perspective, of another embodiment of a system configured in accordance with the present disclosure is shown and generally indicated by the reference number 600. It is noted that the dimensions (i.e., rows and columns) of the arrays carrying through the structure of system 600 can be of any suitable size, although FIG. 5 is representative of a 4×3 array in consideration that one-half of the structure has been cut-away in the view of the figure. System 600 is identical to system 400 of FIG. 4 with the exception of a collector layer 610. In the present embodiment, the collector layer is made up of two sections. A first section 614 defines a pair of adjacent collector horns 618 each one of which receives a portion of modulated output distribution 462. In particular and by way of non-limiting example, each collector horn receives the output of six modulators 424 (i.e., one-half of the array) via exit horns 454. Each collector horn can serve any suitable number of modulator outputs while remaining within the scope of the teachings herein. Insofar as their physical structure and shape, collector horns 618 can be configured in any suitable manner in a way that is consistent with the descriptions above. A portion of modulated light energy 462 is carried by each collector horn 618 to a collector horn output 620. A second section 624 of the collector layer is configured as a waveguide including a passage 630 that extends from each collector horn output 620 to detector 88. Of course, collector horns 618 can be impedance matched to waveguide passages 630, for example, based on the shape of the exit opening of each horn 618 in cooperation with the shape of the entrance to each passage 630. In this regard, passages 630 are illustrated as being of uniform dimensions along their length, however, this is not a requirement.

FIG. 6 is a diagrammatic cutaway view, in perspective, of an embodiment of a system configured in accordance with the present disclosure and generally indicated by the reference number 700. It is noted that system 700 is identical to system 600 of FIG. 5 with the exception of a collector layer 710. The latter does not utilize waveguide 624 section. For purposes of the present description, the horns of collector layer 710 have been individually designated by appending an "a" or "b" to the appropriate reference numbers carried forward from FIG. 5. Thus, horns 618a and 618b are shown with respective horn exits 620a and 620b. These horn exits are individually coupled to respective detectors 88a and 88b. Outputs 500a and 500b each serve one-half of the array and can be read by processor 54 and combined by the processor to serve as an overall output. Based on FIG. 6, it should be appreciated that any suitable number of detectors can be used with a high degree of flexibility based, for example, on the dimensions of the array that is served.

Turning to FIG. 7a, a diagrammatic cutaway view, in perspective, is illustrated of another embodiment of a system configured in accordance with the present disclosure and generally indicated by the reference number 800. Initially, it is noted that collector layer 470 was initially illustrated in FIG. 4 and described with regard thereto. Input light 20 is received by a concentration layer 804. Within each one of a plurality of an array of dome housings 808, each one of a corresponding array of convex lens 810 focuses a portion of input light 20 toward an exit aperture 814 that leads to a light modulator 424. In the present embodiment, lenses 810 and dome housings 808 include a complementary peripheral shape such that each lens can be received at the remote end of an interior cavity defined by one of the dome housings. The lenses can be held in position, for example, by a suitable adhesive. The dome housings and lenses are circular in lateral cross-section although any suitable shape can be used. Each dome housing of the present embodiment includes a conical horn 818 that leads to exit aperture 814. It is noted that the conical horns are not required given the presence of convex lenses 810 which serve to focus input light into apertures 814. Dome housings 808 can be formed from a suitable material that is substantially transparent to the wavelength(s) of interest such as, for example, plastic. Convex lenses 810 can be formed from a suitable material that is also substantially transparent and refractive to the wavelength(s) of interest, including but not limited to plastic, HDPE, and any other suitable material that is substantially transmissive at the desired wavelength(s) and has a dielectric constant greater than 1 in the wavelengths of interest. If desired, an electrically conductive coating can be applied to the interior surface of each conical horn, for example, if the dome housing is molded from a plastic material. Each light modulator 424 modulates a portion of the input light and outputs the modulated light to an exit layer 820 which includes an array of exit horns 460 for producing distribution 462 that is then routed to detector 88.

Attention is now directed to FIG. 7b which is a diagrammatic partially cutaway view, in perspective, of a system produced in accordance with the present disclosure and generally indicated by the reference number 840. It is noted that the structure of system 840 resembles that of system 800 of FIG. 7a with the exception of an exit layer 850. Hence, the present discussions will be limited to describing exit layer 850 insofar as practical without repeating descriptions of previously described components. Essentially, exit layer 850 is made up of an array of convex lenses 854, as will be described in further detail immediately hereinafter.

After modulation of input light 20 by each light modulator 424, modulated light 858 enters an exit aperture 856 that leads to an exit horn 860. In some embodiments, exit aperture 856 can receive a dielectric post that terminates within the exit aperture or extends into the exit horn in a manner that is consistent with the descriptions above. In the present example, horns 860 are conical. It is noted that the modulated light can be uncollimated within horns 860, as illustrated. One of lenses 854 can be supported within each one of a plurality of an array of dome housings 864, to redirect light 858 into distribution 462 for receipt by collector layer 470. Depending at least in part on the configuration of lenses 854, it should be appreciated that distribution 462 can be customized in its lateral extents. In the present embodiment, distribution 462 is more collimated than modulated light 858 while at least approximately matching the lateral extents of the array of lenses 854. In other embodiments, distribution 462 can be greater in lateral extents (i.e., arrows making up distribution 462 diverging) or lesser in lateral extents (i.e., arrows making up distribution 462 converging) than the lateral extents of the array of lenses 854. As examples, a diverging distribution 462' is illustrated by dotted diverging arrows while a converging distribution 462" is illustrated by converging dotted arrows. It is noted that these customized distributions can be implemented based on horns rather than lenses. In the present embodiment, lenses 854 and dome housings 864 include a complementary peripheral shape such that each lens can be received at the remote end of an interior cavity defined by one of the dome housings. The lenses can be held in position, for example, by a suitable adhesive. The dome housings and lenses can be circular in lateral cross-section although any suitable shape can be used. It is noted that the conical horns are not required given the presence of convex lenses 854. Dome housings 864 can be formed from a suitable material that is substantially transparent to the wavelength(s) of interest such as, for example, plastic. Convex lenses 854 can be formed from a suitable material that is also substantially transparent and refractive to the wavelength(s) of interest, including but not limited to plastic, HDPE, and any other suitable material that is substantially transmissive at the desired wavelength(s) and has a dielectric constant greater than 1 in the wavelengths of interest. If desired, an electrically conductive coating can be applied to the interior surface of each conical horn, for example, if the dome housing is molded from a plastic material.

FIG. 8 is a diagrammatic partially cutaway view, in perspective, of another embodiment of a system configured in accordance with the present disclosure and generally indicated by the reference number 900. Initially, it is noted that concentration layer 404, modulation layer 420 and exit layer 450 are essentially the same as the corresponding layers shown originally in FIG. 4. The reader is referred to the descriptions of these layers which appear above and such descriptions will not be repeated for purposes of brevity. It is also noted that detector 88 is unchanged with respect to its appearance in FIG. 4. Collector layer 920, however, includes a dome housing 924 which receives and supports a convex lens 928. The latter focuses distribution 462 toward an exit aperture 480 and sensor 484. Like the corresponding components in FIG. 4, lens 928 and dome housing 928 can include a complementary peripheral shape such that the lens can be received at the remote end of an interior cavity defined by the dome housing. The lens can be held in position, for example, by a suitable adhesive. The dome housing and lens are circular in lateral cross-section although any suitable shape can be used. The dome housing of the present embodiment can include a conical horn 930 that leads to exit aperture 480. The conical horn is not required given the presence of convex lenses 928 which can serve to focus input light directly to sensor 484. Dome housing 924 can be formed from a suitable material that is substantially transparent to the wavelength(s) of interest such as, for example, plastic. Convex lens 928 can be formed from a suitable material that is also substantially transparent and refractive to the wavelength(s) of interest, including but not limited to plastic, HDPE, and any other suitable material that is substantially transmissive in the desired wavelength and has a dielectric constant larger than 1. If desired, an electrically conductive coating can be applied to the interior surface of the conical horn, for example, if the dome housing is molded from a plastic material.

Referring to FIG. 9*a*, a diagrammatic partially cutaway view, in perspective, of a collector layer is illustrated, generally indicated by the reference number 1000. FIG. 9*b* is a diagrammatic exploded view, in perspective, of collector layer 1000 shown in relation to detector 88. It is noted that collector layer 1000 can be used at least in place of collector layer 470 of FIGS. 4 and 7, collector layer 610 of FIG. 5 and collector layer 920 of FIG. 8. Collector layer 1000 can also be adapted for use in a wide range of embodiments such as, for example, as collector layer 710 of FIG. 6 in view of the teachings that have been brought to light herein. While a number of through holes/apertures are visible, it should be appreciated that these features are provided, for example, to receive fasteners that are not shown.

In FIG. 9*a*, previously described exit layer output distribution 462 is shown as being incident on collector layer 1000 from the associated exit layers seen in FIGS. 4, 5 and 7. The collector layer includes a horn layer 1004 which defines an array of horns, several of which are individually designated by the reference number 1008. Horn layer 1004 is also shown, in perspective, in the diagrammatic, partially cutaway view of FIG. 9*c* which is taken generally along a line 9*c*-9*c* shown in FIG. 9*b*. It is noted that the dimensions of horn layer 1004 (i.e., rows and columns) can be of any suitable size, although FIG. 9*a* is representative of an 8×8 array in consideration that slightly less than one-half of the structure of horn layer 1004 has been cut-away in the view of the figure for purposes of illustrative clarity. Each horn 1008 can include a main portion 1010 and an exit port 1014 extending from the main body that is tubular with a uniform cross-sectional shape and dimensions along the length of the exit port. In the present embodiment, the main portion of each horn and the exit port are at least generally square in lateral cross-section, although this is not required. The horn bodies and exit ports of the present example can also include chamfered or rounded corners 1016. In some embodiments, the horn layer can be integrally formed from a single layer of a suitable material such as, by way of non-limiting example, brass, aluminum, steel, or metal-coated plastic.

Referring to FIG. 9*d* in conjunction with FIGS. 9*a* and 9*b*, the former is a diagrammatic partially cutaway view, in perspective, taken generally along a line 9*d*-9*d* shown in FIG. 9*b* to illustrate details with respect to a collector waveguide 1020 which forms part of collector layer 1000. It is noted that FIG. 9*d* illustrates one-half of collector waveguide 1020. As seen in FIGS. 9*a* and 9*d*, collector waveguide 1020 defines a passage maze 1024 that includes an input cavity 1028 (several of which are individually designated) in optical communication with exit port 1014 of one of horns 1008 (FIG. 9*a*). Input cavities 1028 can be impedance matched to exit apertures 1014. Waveguide maze 1024 defines a wave passage that leads from each input cavity 1028 to a combined output 1030 (FIG. 9*d*). The combined output can be impedance matched to an input 1038 (FIG. 9*b*) of detector 88. It is noted that a lower surface 1032 of horn layer 1004, when received on collector waveguide 1020 as shown in FIG. 9*a*, serves as a lid to define one side or sidewall of the wave passages to complete and enclose the wave passages. In the present embodiment, input cavities 1028 are arranged in groups of four 1040, one of which groups is surrounded by a dashed box in FIG. 9*d*. In this embodiment, the path length through waveguide maze 1024 from any one of the input cavities to combined output 1030 is essentially identical in terms of passage length. Collector waveguide 1020 can be formed in any suitable manner and from any suitable material(s). In an embodiment, the collector waveguide can be formed from a sheet material. Suitable methods for producing the collector waveguide include but are not limited to molding, machining, and 3D printing, while suitable materials include but are not limited to brass, aluminum, steel, and metal-coated plastic. These materials can be coated or plated, for example, with a layer of nickel followed by a layer of gold.

Referring briefly to FIG. 9*e*, a diagrammatic partially cutaway view, in perspective, of a modified collector layer is illustrated, generally indicated by the reference number 1000'. Modified collector layer 1000' is the same as collector layer 1000 with the exception that wave passages of waveguide maze 1024 can be partially or completely filled with a dielectric material 1042 such as, for example, alumina and/or ferrite. In an embodiment with the waveguide maze filled by a dielectric, the waveguide interior (i.e., the passages of the waveguide maze) can be formed, for example, by injection molding or 3D printed using a dielectric such as plastic and then the waveguide exterior can be plated onto the exterior of this structure to form conductive walls.

FIG. 9*f* is a diagrammatic partially cutaway view, in perspective, of a modified collector layer, generally indicated by the reference number 1000". Modified collector layer 1000" is the same as collector layer 1000 with the exception that horn layer 1004 has been replaced by a lens layer 1050 that is made up of an array of convex lenses, several of which are individually designated by the reference number 1054. Lenses 1054 can be supported by a suitable dome 1058 in a manner that is consistent with like structures described herein. Bases 1060 supporting domes 1058 can define a conical horn 1064 having an aperture that couples to a passage of waveguide maze 1024, although a conical horn is not a requirement and any suitable shape can be used.

Referring to FIGS. 10 and 11, FIG. 10 is a diagrammatic partially cutaway view, in perspective, of another embodiment of a system configured in accordance with the present disclosure and generally indicated by the reference number 1100 while FIG. 11 is a diagrammatic partially cutaway and exploded view, in perspective, of system 1100. Processor 54, display 94 and input device 96 have not been shown for purposes of illustrative clarity but are understood to be present.

Initially, it is noted that concentration layer 404 and modulation layer 420 are essentially the same as the corresponding layers shown originally in FIG. 4 with one exception that FIGS. 10 and 11 illustrate an 8×8 array rather than a 3×3 array. The reader is referred to the descriptions of these layers, which appear above, and such descriptions will not be repeated for purposes of brevity. It is also noted that detector 88 is unchanged with respect to its appearance in FIG. 4. As another exception a collection layer 1110 is arranged for direct transfer of energy from modulation layer 420. The term "direct transfer" is utilized to refer to embodiments that do not require an exit layer. In other words, modulated light is carried or delivered from the modulation layer directly to the collection layer. The collection layer includes previously described collector waveguide 1020 upon which a collection lid 1114 is receivable. A distal end 1120 (FIG. 11) of each lower dielectric post 440 is received through a corresponding aperture 1124 that is defined by lid 1114. In this regard, is noted that the collection lid serves to complete one side of the passages that are defined by waveguide maze 1024 of the collector waveguide. A printed circuit board is understood to be present for driving modulators 424 but has not been shown for purposes of illustrative clarity. Distal ends 1120 (FIG. 11) of lower dielectric posts 440 are positioned for direct transfer of modulated electromagnetic energy to cavities 1028 of the collector waveguide that is then combined enroute to the detector (see FIG. 10). Collection lid 1114 can be formed from any suitable material(s) including, but not limited to brass, aluminum, steel, and metal-coated plastic.

In another embodiment, each dielectric post 440, along with any jacketing provided, can extend only partially through apertures 1124 such that a lowermost portion of each aperture serves as a waveguide. In this regard, collector waveguide 1020, by way of non-limiting example, can be formed from a suitable waveguide material or the lowermost interior wall of the aperture can be coated with a suitable waveguide material. The lateral extents of the aperture can be configured at an upper end to receive posts 440 and change along the length of the aperture to the lower end thereof to account for impedance matching considerations leading into cavities 1028.

FIG. 12 is a diagrammatic view, in perspective, illustrating an embodiment of an optoelectronic system, generally indicated by the reference number 1200 and produced in accordance with the present disclosure. System 1200 can include sensor 88, for sensing electromagnetic radiation of interest such as, for example, millimeter wave (MMW) radiation 1204 from a scene 1208 that is of interest. It is noted that electromagnetic radiation 1204 may be referred to as input light. The input light is incident upon a concentration layer 1210 which, in this example is an array of horns with several concentrating horns of the array individually designated by the reference number 1214. It is noted that, in another embodiment, concentration layer 1210 can be made up of an array of lenses such as convex lenses. Benefits associated with concentration layer 1210 will be discussed at an appropriate point hereinafter, once the reader has been provided a complete overview of the remaining components of system 1200. After passing through concentration layer 1210, concentrated input light 1218 travels to a modulation layer that includes a spatial light modulator 1220.

Referring to FIG. 13 in conjunction with FIG. 12, the former is a further enlarged, diagrammatic perspective view illustrating additional details of spatial light modulator 1220 of FIG. 15 and its interface to processor 54. It is noted that FIG. 13 appears as FIG. 2a in U.S. Pat. No. 10,698,290, entitled ADVANCED BLOCKING PATTERN STRUCTURES, APPARATUS AND METHODS FOR A SPATIAL LIGHT MODULATOR, which is incorporated herein by reference and hereinafter referred to as the '290 Patent. In this embodiment, the spatial light modulator includes first and second reels, spindles or spools 1260a and 1260b, respectively, each of which is supported for bidirectional rotation as indicated by arcs 1264. Reel 1260a can be bidirectionally driven by a first motor 1266a, as indicated by a double headed arrow 1268a, while reel 1260b can be bidirectionally driven by a second motor 1266b, as indicated by a double-headed arrow 1268b. In the present embodiment, motor 1266a is a stepper motor while motor 1266b is a DC motor such that a flexible blocking pattern tape or ribbon 1300 can be spooled bidirectionally between reels 1260a and 1260b, as indicated by a double headed arrow 1304. It is noted that reels 1260a and 1260b along with associated motors 1268a and 1268b may be referred to herein as a flexible tape transport. A free or lateral portion 1306 of the tape extends between reels 1260a and 1260b. In addition to a blocking pattern 1310, tape 1300 can carry an upper servo stripe 1314a along each its upper lengthwise edge margin and a lower servo stripe 1314b along its lower lengthwise edge margin, each servo stripe including suitable servo marks 1318, as will be further described. The servo stripes may be referred to collectively using the reference number 1314. It is noted that the servo stripes and blocking pattern carry around spooled portions of tape 1300 on reels 1260a and 1260b, however, this has not been shown due to illustrative constraints. It is also noted that a grid 1319 defining the individual cells of the blocking patterns shown in FIGS. 12 and 13 is provided by way of illustration for purposes of descriptive clarity and is not required. The tape transport of FIGS. 12 and 13, like related embodiments brought to light in the '736 Application employ at least one flexible tape, including at least one linear portion (e.g., free portion 1306) along which the flexible tape is moved linearly in a plane along a lengthwise dimension and a nonlinear portion which, in the present embodiment are end portions of the flexible tape spooled on reels 1260a and 1260b. It is noted that the teachings that have been brought to light herein are equally applicable with respect to embodiments that utilize two flexible tapes. In the present embodiment, at least a portion of the overall tape transport path is nonlinear. First and second upper readers 1320a and 1320b, which may be referred to collectively as upper readers 1320, are supported to read the upper servo stripe while first and second lower readers 1324a and 1324b, which may be referred to collectively as lower readers 1324, are supported to read the lower servo stripe. It is noted that the upper and lower readers are supported independent of the support for motors 1266a and 1266b such that the readers detect relative movement of the tape which can be, for example, movement of the tape up and down on reels 1260a and 1260b or even relative vertical movement of these reels themselves. In some embodiments, only one servo stripe is needed, along with its associated readers. Each reader can operate, for example, based on emitting light from an LED and receiving the emitted light using a photodiode or phototransistor on an opposing side of the ribbon. It is noted that, due to the use of stepper motor 1266a, servo stripes 1314 and the associated readers can be optional, as will be further discussed. In another embodiment, motor 1266a, like motor 1266b, can be a DC motor in which case, servo stripes 1314 and the associated readers are required. In still another embodiment, a tensioning arrangement can maintain a suitable amount of tension on tape 1300. Such a tensioning arrangement, for example, can comprise a roller or rod movable by a linear stage such that movement in one direction engages the flexible tape to increase tension while movement in an opposite direction reduces tension. Controller computer or processor 54 can include monitor 92 and input device 94. In FIG. 12, an interface 1350 is connected to spatial light modulator 1220 to provide electrical communication with controller computer 54. A sensor signal line 1354 provides signals from sensor 88 to controller computer 54. As seen in FIG. 13, interface 1350 includes a first reader interface 1360 from upper servo readers 1320a and 1320b and a second reader interface 1364 from lower servo readers 1324a and 1324b. The reader interfaces can provide an individual signal from each reader to processor 54 which can provide information relating to the status of flexible blocking pattern tape 1300 such as, for example, being indicative of buckling along free portion 1306. It is noted that power supply lines for the readers and other components have not been shown but are understood to be present. Drive signals for motor 1266a are provided by a first motor drive interface 1368 while drive signals for motor 1266b are provided by a second motor drive interface 1370. It is noted that the spool size (i.e., diameter) for reels 1260a and 1260b can be selected to balance various factors. For example, a relatively larger spool size (i.e., greater diameter) will result in lower stress on flexible tape 1300, leading to longer life. On the other hand, such relatively larger reels consume more space and are likely more heavy.

As seen in FIG. 12, a portion 1372 of electromagnetic wave radiation or input light (i.e., a portion of incident radiation 1218) emerges from tape 1300, indicated by arrows, and travels toward sensor 88 for collection by a horn 1374 and concentration onto this single pixel sensor such that horn 1374 serves as a collection layer. FIG. 13 illustrates an exposure region 1400 that is planar and indicated by a heavy, dashed line, such that at least a portion of radiation 1218 (FIG. 1) passing through region 1400 is collected and, thereafter, incident on sensor 88. In the present example, region 1400 forms a blocking pattern that is made up of a 6×6 array of cells. Generally, electromagnetic radiation that transits through tape 1300 outside of region 1400 such as, for example, through the servo stripes is rejected.

During operation of system 1200, stepper motor 1266a is driven by control computer 54 to controllably release or take up tape 1300 to selectively establish the lateral segment of the tape that makes up the blocking pattern appearing in region 1400. At the same time, control computer 54 drives DC motor 1266b to maintain at least some degree of tension on free or suspended portion 1306 of the tape extending between reels 1260a and 1260b, thereby ensuring that the free portion remains sufficiently planar or flat (i.e., linear). In this way, motors 1266a and 1266b can cooperatively and precisely position a series of different blocking patterns within region 1400 with controller computer 54 capturing a reading from sensor 88 in association with each of the different blocking patterns. As will be further discussed, there will be some amount of tolerance in the precision of positioning a particular blocking pattern on tape 1300 within exposure region 1400. In this regard, system 1200 provides a heretofore unseen approach in dealing with this tolerance, as will be further discussed.

Turning the reader's attention back to concentration layer 1210, it should be appreciated that one concentrating horn 1214 of the horn array is aligned with each cell of any given blocking pattern of tape 1300 that is positioned in exposure region 1400. An input aperture 1404 of each concentration horn that faces scene 1208 includes essentially the same lateral dimensions as the corresponding cell. That is, the lateral dimensions are length and width in a direction transverse to the direction of travel of input light 1204, as shown. Each concentration horn 1208 further includes an output aperture 1408 that is smaller in lateral dimensions that the corresponding cell of the blocking pattern. Assuming perfect alignment of the blocking pattern in exposure region 1400, concentrating horns direct their concentrated output light 1218 onto a central region of the cells in the blocking pattern. Central regions 1410 of two adjacent cells are illustrated as rectangles in FIG. 13 under the assumption of perfect alignment. Accordingly, the concentrated output light is incident upon each cell spaced away from the actual edges of the cell when there is perfect blocking pattern alignment. Thus, at least some tolerance for misalignment of the blocking pattern within the exposure region is provided by a margin around the edges of the cells, since the blocking pattern can shift side-to-side and/or up and down at least to some extent without the concentrated input light moving beyond the margins and spilling onto an adjacent cell of the blocking pattern. The reduction in required precision in movement of tape 1300 can translate into a number of different benefits. For example, cost can be reduced by lowering tolerance requirements for positioning of tape 1300. As another example, structures can be incorporated into tape 1300 within the inter-cell margins. In an embodiment that uses a clear (i.e., transparent) substrate to form tape 1300 with deposited metal to form the blocking pattern, the plated area can be made smaller to approximately match the size of central regions 1410 and/or the clear substrate can be made relatively thinner in central regions 1410 to enhance electromagnetic energy transfer while maintaining the substrate relatively thicker outside of the central regions to enhance strength.

It should be appreciated that tape 1300 can be moved in either direction by the motors. Reels 1260a and 1260b, as is the case with reels in other embodiments, can include features to guide the tape, such as contours, steps, texturing and/or flanges. In some embodiments, tape 1300 is moved the full width of exposure region 1400 from one blocking pattern to the next in the series, while, in other embodiments, the tape can be moved by an incremental amount that is less than the full width of region 1400 from one blocking pattern to the next. It is noted that an incremental movement can be as small as the width of one cell of the blocking pattern. Movements by some multiple number of cell widths may produce a more acceptable change from one blocking pattern to the next, especially given Applicants' recognition that real life scenes tend to be self-correlated. In any embodiment that employs a flexible blocking pattern tape, a tape transport supports the flexible tape(s) for movement to transit the tape linearly through the electromagnetic energy in exposure region 1400 as the electromagnetic energy is traveling from the antenna to the single pixel sensor. At the same time, the flexible tape moves on a tape transport path that is, at least in part, nonlinear outside of the exposure region.

Still referring to FIGS. 12 and 13, flexible blocking pattern tape 1300 includes a flexible substrate that is transmissive at the wavelength of interest. Suitable materials for visible light include, but are not limited to Novele and Polyethylene terephathalate (PET). Suitable materials for millimeter wave (MMW) radiation include, but are not limited to polyimide, PET, and Novele. Thus, transmissive cells are essentially comprised of the substrate material itself with no additional coatings or materials. For the "black" or non-transmissive cells, metallic coatings such as, for example, copper and silver can readily be made flexible at required thicknesses for wavelengths from optical to MMW radiation. The coatings can be applied to form the desired pattern on the substrate, for example, by electrodeposition through a mask, roll-to-roll processing, sheet deposition followed by chemical etching, and ink jet printing. It is noted that any suitable technique can be employed and that the size or dimensions of the cells can be suited to any desired wavelength. In another embodiment, the tape can be formed from a thin flexible metal such as, for example, steel having holes or apertures formed therein to define the transmissive cells of the blocking pattern. This latter embodiment can be very robust and can be suited to any desired wavelength by changing the dimensions of the cells. Moreover, enhanced stiffness, as compared to a plastic substrate, can enhance controllability.

Having described structural details of spatial light modulator 1220 above in the context of system 1200, it is appropriate at this junction to consider aspects of its operation. Generally, a set or series of blocking patterns is used such that a sensor output is recorded for each blocking pattern of the series. Relative increases in the number of blocking patterns in the series as well as increasing the number of cells that change or toggle between a transmissive status and a non-transmissive status from one blocking pattern to the next can serve to enhance image resolution and clarity. Any suitable series of blocking patterns can be used such as, for example, Hadamard patterns or randomly generated patterns. To generate an image, controller computer 54 actuates motors 1266a and 1266b to move tape 1300 such that a desired blocking pattern is positioned in exposure region 1400. An initial or beginning blocking pattern can be the first pattern proximate to one of the opposing ends of the tape, although this is not a requirement. Controller computer 54 reads the output of sensor 88, for example, via analog to digital conversion of the sensor voltage output, and saves that converted output. In the present embodiment, the sensor value is captured when tape 1300 is stationary. In some embodiments, it is not necessary for the tape to be stationary based, at least in part, on the characteristics of the particular sensor that is in use. If another blocking pattern is needed for generating the image currently in process, controller computer 54 moves tape 1300 and thereby a new blocking pattern into exposure region 1400 and then obtains a new sensor output. This process repeats until a complete set of sensor outputs is obtained for use in generating an image.

It should be appreciated that multiple instantiations of systems described above can be positioned in a side-by-side relationship and used in coordination for purposes of generating an image. By way of non-limiting example, systems that utilize aforedescribed collector waveguide 1020 as an element of their structure can readily be positioned side-by-side. FIG. 14 is a diagrammatic partially cutaway view, in perspective, illustrating four collector waveguides designated as 1020a, 1020b, 1020c and 1020d side-by-side for use as part of an overall system generally indicated by the reference number 1420. The collector waveguides may be referred to collectively as collector waveguides 1020. Associated systems are partially shown in phantom using dashed lines and indicated by the reference numbers 1100a-1100d. Each of systems 1100a-1100d includes a detector 88a-88d and a collector waveguide 1020a-1020d, respectively. It is noted that collector waveguides 1020a and 1020b are shown as partially cutaway to reveal associated detectors, while the detectors associated with collector waveguides 1020c and 1020d are not visible but are understood to be present. The detector associated with each collector waveguide can be coupled with processor 54 (not shown) which can also control any light modulators that are in use in a manner that is consistent with the descriptions above. Systems 1100a-1100d can be referred to as spatial light modulation modules such that each module is individually replaceable and/or individually usable. For example, given that any suitable number of spatial light modulation modules can be used, different fields of view can be provided by using different combinations of modules. As another example, manufacturing benefits are provided since the production yield on a light modulator having a relatively smaller light modulator array will be significantly higher than the yield on a light modulator array that is some number of times larger (e.g., using nine 16×16 modular arrays to make up an overall 48×48 modulator array.) Moreover, Applicant recognizes that the production costs associated with nine 16×16 modular arrays are lower than those associated with one 48×48 array. As another example, since each 16×16 module includes a dedicated detector, the light modulation modules can be operated in parallel to fill-in an image being generated faster and with less loss than a corresponding system with a single detector.

FIG. 15 is a diagrammatic partially cutaway view, in perspective, illustrating collector waveguides 1020a, 1020b, 1020c and 1020d side-by-side for use as part of another overall system that is generally indicated by the reference number 1440. Each collector waveguide 1020a-1020d forms part of a sub-module designated as 1444a-1444d, respectively, and partially shown in phantom using dashed lines. The sub-modules may be referred to collectively by the reference number 1444. In the present embodiment, each of sub-modules 1444a-1444d includes concentration layer 404 and modulation layer 420 (see FIG. 10) in addition to one instance of collector waveguide 1020. It is noted that collector waveguide 1020a is shown as partially cutaway. An uppermost outer periphery of the cutaway portion of collector waveguide 1020a as well as the entirety of collector waveguide 1020b are shown in phantom represented by dashed lines so as to reveal underlying structure. In particular and instead of utilizing a detector for each collector waveguide, the present embodiment utilizes a supplemental waveguide layer 1500 which includes an input from the collector waveguide of each sub-module. In the figure, supplemental waveguide inputs 1504a and 1504b are seen for collector waveguides 1020a and 1020b, respectively. The supplemental waveguide inputs for collector waveguides 1020c and 1020d are not visible but are understood to be present. Supplemental waveguide layer 1500 defines a wave passage for each collector waveguide leading to a combined output 1510 such that a combined output light 1514 is directed to detector 88 which is shown as being spaced away from the remaining structure for purposes of illustrative clarity, although this is not required. Detector 88 is coupled with processor 54 (not shown) which can also control any light modulators that are in use in a manner that is consistent with the descriptions above. In view of the discussions of FIG. 14, it should be appreciated that each of sub-modules 1444 can be replaced individually while providing still further benefits with regard to reducing production costs by utilizing a dimensionally smaller light modulator array than the equivalent size of the overall array that is provided by system 1440.

Attention is now directed to FIG. 16 which is a diagrammatic cutaway view, in perspective, of a system produced in accordance with the present disclosure and generally indicated by the reference number 400'. It is noted that system 400' can be essentially identical to system 400 of FIG. 4 with the exception of the configuration of an exit layer 450'. Accordingly, descriptions of like components will not be repeated for purposes of brevity. In system 400', exit layer 450' is essentially a mirror image of concentration layer 404. Accordingly, modulated light 1600 from each lower dielectric rod 440 flows in an opposite direction with respect to concentration layer 404. That is, light 1600 enters a port 414', which serves as an entry port, and then passes into each horn body 410' through a smaller opening of the horn body.

The larger, lower openings of horn bodies 410' then emits distribution 462 to collection layer 470. It should be appreciated that an exact mirror image of concentration layer 404 is not required since dimensions can be adjusted based on considerations including but not limited to impedance matching to the collector layer. It remains, however, that the lowermost end of lower dielectric rod is in a non-contact, spaced apart relationship from a portion of the sidewall(s) of exit port 414', extending into exit port 414' without extending into horn body 410'. With regard to this configuration as well as embodiments described below, Applicant has demonstrated surprising and unexpected empirical and theoretical results leading to an improvement in coupling between an entrance/exit port and an associated dielectric rod, irrespective of the direction of energy flow, as compared to a direct contact fit between the sidewalls of dielectric rod within the entrance/exit port and a portion of the sidewalls of the entrance/exit port. Applicant submits that this configuration would be counterintuitive to one of ordinary skill in the art who would most likely terminate the post at the floor or as a floor of an exit or entrance port.

Given that the embodiments shown in FIGS. 5, 6 and 8 utilize concentration layer 404 of FIGS. 4 and 16 while utilizing exit layer 450 of FIG. 4, it should be appreciated that exit layer 450' of FIG. 16 can be used in each of the embodiments of FIGS. 5, 6 and 8 with attendant benefits. Applicant further submits that the teachings brought to light herein with respect to coupling between a horn and dielectric post are broadly applicable with respect to any light path in which this configuration of components is utilized, as shown in FIGS. 17 and 18, yet to be described.

Referring to FIGS. 17 and 18, one embodiment of an apparatus, generally referred to by the reference number 1700, which includes a horn housing 1704 and a dielectric rod or post 1708, which may be referred to hereinafter as an HDP (Horn Dielectric Post) arrangement, is diagrammatically shown. FIG. 17 shows the HDP arrangement in a partially cut-away view while FIG. 18 shows the HDP arrangement in a partially cut-away perspective view. Horn housing 1704 defines a horn 1710 having a main portion that extends between a first larger opening 1714 and tapers to a second, smaller opening 1718. In the present embodiment, the main portion is at least generally rectangular in lateral cross-section, although it can be square. The corners can be chamfered in a suitable manner, although this is not a requirement. In this regard, any suitable shape can be used for the main portion of horn 1710. For example, the main portion can be a frustum. In the illustrated embodiment, the main portion is a right frustum. In another embodiment, the main portion can be frustoconical such that the lateral cross-sectional shape is circular. Horn housing 1704 further defines a port 1720 that extends from second opening 1718 of the main portion of horn 1710 and is tubular with an least generally uniform cross-sectional shape and dimensions along the length of the tubular port. The latter is terminated by a floor 1724 (i.e., a lower end of the port in the view of the figure). In the present embodiment, the tubular port is rectangular in lateral cross-section to match second opening 1718. In another embodiment, the port can be cylindrical with a sidewall extending between upper and lower opposing ends of the port. The lateral dimensions of the smaller opening of the horn main portion can match the lateral dimensions of the tubular port. Horn housing 1704 can be a single layer of a suitable material such as, by way of non-limiting example, brass, aluminum, steel, or metal-coated plastic. In other embodiments, the horn body and associated tubular port can be formed separately, for instance, by different material layers that are joined in a suitable manner. In an embodiment, the horn body can be formed as a set of cooperating sidewalls from sheet material (s). Such sheet materials can include, by way of non-limiting example, electrically conductive material or non-electrically conductive materials coated with an electrically conductive layer.

Still referring to FIGS. 17 and 18, dielectric post 1708 can include a cylindrical shape with one end 1730 received within port 1720 of horn 1710 and an opposing end 1734 arranged for external light coupling such as, for example, to a light modulator 1738 which is shown in phantom using dashed lines in FIG. 17. In the present example, input light 1740, shown above first opening 1718 as a distribution 1740 using a set of arrows, is received by horn 1710, travels into port 1720 and is then coupled into dielectric post 1708 for coupling to modulator 1738 (FIG. 17) along an overall light path 1744 which is illustrated by an arrow. It is noted that light path 1744 can be externally coupled from the lower end of the dielectric post in any suitable matter to any suitable component and coupling to a modulator is not a requirement. Such suitable components include, but are not limited to another horn, a lens, a grating, a waveguide or waveguide matrix such as 1024. In the present example, the lateral cross-sectional shape of port 1720 can be square or rectangular while the lateral cross-sectional shape of the upper dielectric rod is circular. It is noted that this is not a requirement. For example, the lateral cross-sectional shape of port 1720 can be circular, particularly when main portion of the horn is frustoconical. Thus, the shape of the exit port sidewall can be complementary to the shape of the sidewall of the dielectric rod at least to the extent that the dielectric rod extends into the exit port in order to provide a confronting relationship. In any case, as illustrated, the upper end of the dielectric rod does not extend into the main portion of horn 1710 but instead extends through floor 1724 and terminates within port 1720. Thus, the sidewall of the end of the dielectric post within port 1720 are in a spaced apart, non-contacting relationship with the sidewalls that define the exit port. Applicant has discovered, in this regard, that modeling as well as empirical demonstrate that termination of the dielectric post within port 1720 in conjunction with maintaining the described spaced apart relationship enhances optical coupling between the dielectric rod and horn 1710.

Dielectric post 1708 can be jacketed with a waveguide 1750 that is a suitable electrically conductive material, although such a waveguide is not required. Any suitable conductive material can be used for the jacket, such as, for example, aluminum, stainless steel, nonmagnetic steel, gold, gold-plated plastic or plastic coated with nickel and then gold. In any case, Applicant notes that extending waveguide 1750 into port 1720 serves to reduce coupling efficiency with horn 1710. Thus, waveguide 1750 is terminated outside of port 1720 in the illustrated embodiment. Suitable materials for dielectric post 1708 include but are not limited to any material that has a dielectric constant greater than the surrounding atmosphere or ambient including, by way of non-limiting example, alumina, ferrite, and HDPE.

Still referring to FIGS. 17 and 18, it should be appreciated that HDP (Horn Dielectric Post) arrangement 1700 supports the flow of energy in each potential direction therethrough or bidirectionally. In this regard, FIG. 18 illustrates a light path 1744', representing external light energy, entering what is shown as a free end 1754 of dielectric post 1708 with subsequent emission of a distribution 1740' of light responsive to the entering light. What is shown as free end 1754 can be coupled to any suitable external component including but not limited to a modulator, a lens, a horn, a grating, a waveguide or a waveguide matrix such as aforedescribed waveguide maze 1024. It should be appreciated that, irrespective of the direction of flow, the HDP arrangement can modify the lateral dimensional characteristics of the light path to suit a particular application.

The foregoing description of the invention has been presented for purposes of illustration and description. It is not intended to be exhaustive or to limit the invention to the precise form or forms disclosed, and other modifications and variations may be possible in light of the above teachings. Accordingly, those of skill in the art will recognize certain modifications, permutations, additions and sub-combinations of the embodiments described above.

What is claimed is:

1. In a system defining a light path, an apparatus comprising:
    a horn including
        a horn body having at least one horn sidewall defining a first opening that tapers down to a second opening in a direction of elongation such that the first opening includes a first area that is larger than a second area of the second opening, and
        a port that is tubular and uniform in cross-sectional shape transverse to the direction of elongation and extends with uniform dimensions in the direction of elongation
            (i) from a first port end that is matched in area with the second area of said second opening,
            (ii) to a second port end that defines an external opening, and said port includes at least one port sidewall extending from the first port end to the second port end surrounding a port cavity; and
        a dielectric rod having a rod length extending between a first rod end and a second rod end with the first rod end extending through said external opening of the second port end and into the port cavity such that the first rod end is a free end of the dielectric rod within the port cavity in a spaced apart relationship from the port sidewall along the light path and the second rod end is configured for external communication along the light path;
    wherein the apparatus defines the light path in (i) one direction from the first opening of the horn body to the second rod end of the dielectric rod and (ii) an opposite direction from the second rod end of the dielectric rod to the first opening of the horn body.

2. The apparatus of claim 1 wherein the horn body is air-filled.

3. The apparatus of claim 1 wherein the port cavity is air-filled surrounding the first rod end.

4. The apparatus of claim 1 wherein the horn body is frustoconical.

5. The apparatus of claim 1 wherein the horn body forms a frustum.

6. The apparatus of claim 1 wherein the first rod end of the dielectric rod does not extend into the horn body through the second opening of the horn body.

7. The apparatus of claim 1 wherein the horn body is at least generally square transverse to the direction of elongation and is made up of four major horn sidewalls.

8. The apparatus of claim 1 wherein the horn body is at least generally circular transverse to the direction of elongation.

9. The apparatus of claim 1 wherein the tubular configuration of the port is at least generally square transverse to the direction of elongation.

10. The apparatus of claim 1 wherein the tubular configuration of the port is at least generally circular transverse to the direction of elongation.

11. The apparatus of claim 10 wherein the dielectric rod forms a cylinder extending from the first rod end to the second rod end.

12. The apparatus of claim 1 wherein the horn is integrally formed in a layer of electrically conductive material that serves to define said horn body and said port.

13. The apparatus of claim 1 wherein the horn body is formed separately from the port and, thereafter, joined to the port.

14. The apparatus of claim 1 wherein the horn body and the port are formed to include a suitable material selected as at least one of gold, aluminum, copper, gold-plated brass and gold-plated plastic.

15. A method for producing an apparatus for use in a light path, said method comprising:
    configuring a horn to include
        a horn body having at least one horn sidewall defining a first opening that tapers down to a second opening in a direction of elongation such that the first opening includes a first area that is larger than a second area of the second opening and
        a port that is tubular and uniform in cross-sectional shape transverse to the direction of elongation and extends with uniform dimensions in the direction of elongation
            (i) from a first port end that is in optical communication with said second opening,
            (ii) to a second port end that defines an external opening, and said port includes at least one port sidewall extending from the first port end to the second port end surrounding a port cavity; and
    positioning a dielectric rod having a rod length extending between a first rod end and a second rod end such that the first rod end extends through said external opening of the second port and into the port cavity so that the first rod end is a free end of the dielectric rod within the port cavity in a spaced apart relationship from the port sidewall configuration along the light path and arranging the second rod end for external communication;
    wherein the apparatus defines the light path in (i) one direction from the first opening of the horn body to the second rod end of the dielectric rod and (ii) an opposite direction from the second rod end of the dielectric rod to the first opening of the horn body.

\* \* \* \* \*